US012474657B2

(12) United States Patent
Hayashi et al.

(10) Patent No.: US 12,474,657 B2
(45) Date of Patent: Nov. 18, 2025

(54) IMAGE FORMING SYSTEM INCLUDING SHEET LAMINATOR AND METHOD OF CONTROLLING POWER CONSUMPTION

(71) Applicants: Yuuta Hayashi, Tokyo (JP); Yukio Morooka, Tokyo (JP); Kizuku Ohno, Kanagawa (JP); Yuusuke Yamamoto, Kanagawa (JP)

(72) Inventors: Yuuta Hayashi, Tokyo (JP); Yukio Morooka, Tokyo (JP); Kizuku Ohno, Kanagawa (JP); Yuusuke Yamamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/632,762

(22) Filed: Apr. 11, 2024

(65) Prior Publication Data

US 2024/0345521 A1 Oct. 17, 2024

(30) Foreign Application Priority Data

Apr. 13, 2023 (JP) ................................ 2023-065516

(51) Int. Cl.
*G03G 15/20* (2006.01)
*G03G 15/00* (2006.01)

(52) U.S. Cl.
CPC ......... *G03G 15/5004* (2013.01); *G03G 15/80* (2013.01); *G03G 2215/004* (2013.01); (Continued)

(58) Field of Classification Search
USPC ........................................................... 399/37
See application file for complete search history.

(56) References Cited

U.S. PATENT DOCUMENTS 5,306,381 A * 4/1994 Nakazawa .............. B32B 38/14
219/508
2021/0347589 A1 11/2021 Suzuki et al.
(Continued)

FOREIGN PATENT DOCUMENTS

JP 2005-221900 A 8/2005
JP 2007-133158 A 5/2007
(Continued)

OTHER PUBLICATIONS

Extended European Search Report dated Sep. 24, 2024 issued in corresponding European Patent Application No. 24169646.7.

*Primary Examiner* — Quana Grainger
(74) *Attorney, Agent, or Firm* — Harness, Dickey & Pierce, P.L.C.

(57) ABSTRACT

An image forming system includes an image forming apparatus, a sheet laminator, and circuitry. The sheet laminator performs a lamination processing on a two-ply sheet with a sheet, which is conveyed from the image forming apparatus and inserted between two sheets of the two-ply sheet. The circuitry performs a lamination print mode and a shift mode. In the lamination print mode, the sheet laminator performs the lamination processing on the sheet. In the shift mode, a power supply to the image forming apparatus starts and the power supply ends when the power supply reaches a first peak value and is stabilized during a first start-up period. Also, in the shift mode, the power supply to the sheet laminator starts and the power supply ends when the power supply reaches a second peak value and is stabilized during a second start-up period shifted from the first start-up period.

16 Claims, 22 Drawing Sheets

(52) U.S. Cl.
CPC ............ *G03G 2215/00666* (2013.01); *G03G 2215/00801* (2013.01)

(56) References Cited

U.S. PATENT DOCUMENTS

| | | | |
|---|---|---|---|
| 2021/0387467 | A1 | 12/2021 | Asano et al. |
| 2023/0278819 | A1 | 9/2023 | Koba et al. |

FOREIGN PATENT DOCUMENTS

| | | | |
|---|---|---|---|
| JP | 2008-278680 | A | 11/2008 |
| JP | 2013-156574 | A | 8/2013 |
| JP | 2015-025908 | A | 2/2015 |
| JP | 2018-185379 | A | 11/2018 |
| JP | 2021-176791 | A | 11/2021 |
| JP | 2021-194909 | A | 12/2021 |

* cited by examiner

FIRST MODIFICATION

FIRST MODIFICATION

SECOND MODIFICATION

SECOND MODIFICATION

IMAGE FORMING SYSTEM INCLUDING SHEET LAMINATOR AND METHOD OF CONTROLLING POWER CONSUMPTION

CROSS-REFERENCE TO RELATED APPLICATIONS

This patent application is based on and claims priority pursuant to 35 U.S.C. § 119 (a) to Japanese Patent Application No. 2023-065516, filed on Apr. 13, 2023, in the Japan Patent Office, the entire disclosure of which is hereby incorporated by reference herein.

BACKGROUND

Technical Field

Embodiments of the present disclosure relate to an image forming system including an image forming apparatus that prints an image on a sheet and a sheet laminator that performs lamination processing.

Related Art

An image forming system is known that includes a sheet laminator that performs lamination processing on a sheet with an inner sheet is inserted between two sheets, and an image forming apparatus that forms an image on the inner sheet.

Specifically, the sheet laminator of the image forming system separates two sheets of a laminate sheet, i.e., a two-ply sheet, in which one side of an end of each of the two sheets are joined on one on another, and inserts an inner sheet on which an image is printed by the image forming apparatus between the two sheets. The laminate sheet with the inner sheet inserted is conveyed to a sheet lamination device in which a heater is installed. Then, the sheet laminator heats and pressurizes the laminate sheet to perform lamination processing. Alternatively, in an image forming apparatus to which a peripheral device is connected, a technology is known that employs a power storage device, i.e., a capacitor installed in an image forming apparatus such that the image forming apparatus can be operated even when the power consumption of the image forming apparatus exceeds an upper-limit value.

SUMMARY

In an embodiment of the present disclosure, an image forming system includes an image forming apparatus, a sheet laminator, and circuitry. The image forming apparatus prints an image on a sheet. The sheet laminator includes a heater to perform a lamination processing on a two-ply sheet with the sheet, which is conveyed from the image forming apparatus and inserted between two sheets of the two-ply sheet. The circuitry performs a lamination print mode and a shift mode. In the lamination print mode, the sheet laminator performs the lamination processing on the sheet printed and conveyed from the image forming apparatus. In the shift mode, a power supply to the image forming apparatus starts and the power supply ends when the power supply reaches a first peak value and is stabilized during a first start-up period. Also, in the shift mode, the power supply to the sheet laminator starts and the power supply ends when the power supply reaches a second peak value and is stabilized during a second start-up period shifted from the first start-up period.

In another embodiment of the present disclosure, an image forming method includes printing, performing a lamination processing, performing a lamination print mode, and performing a shift mode. The printing prints an image on a sheet by an image forming apparatus. The performing a lamination processing causes the lamination processing to be performed by a sheet laminator on a two-ply sheet with the sheet, which is inserted between two sheets of the two-ply sheet. The performing a lamination print mode causes the lamination processing to be performed on the sheet printed and conveyed. The performing a shift mode causes to start a power supply to the printing and end the power supply when the power supply reaches a first peak value and is stabilized during a first start-up period, and causes to start the power supply to the lamination processing and end the power supply when the power supply reaches a second peak value and is stabilized during a second start-up period shifted from the first start-up period.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
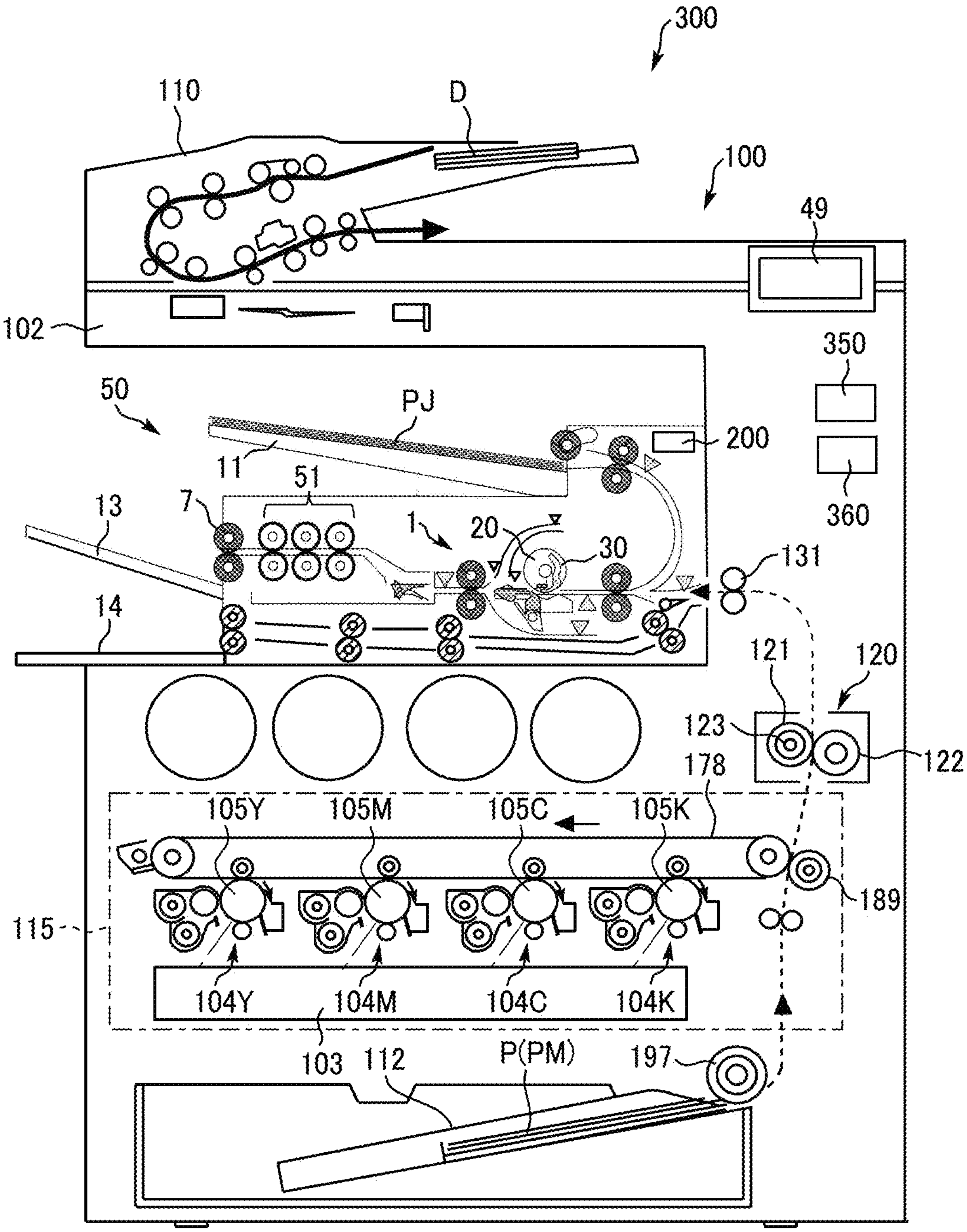
FIG. 1 is a diagram illustrating an overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described in detail with reference to the drawings below. Like reference numerals are assigned to like or equivalent components and a description of those components may be simplified or omitted.

A description is given of the configuration and operations of an image forming system 300 according to an embodiment of the present disclosure, with reference to FIG. 1.

As illustrated in FIG. 1, the image forming system 300 according to the present embodiment includes a sheet laminator 50 having a function of sheet lamination. The sheet laminator 50 is disposed in the inner body of an image forming apparatus 100. To be more specific, the inner body of the image forming apparatus 100 is a space between a document reading device 102 and an image forming device 115.

The image forming apparatus 100 is a part of the image forming system 300 other than the sheet laminator 50. In other words, the image forming system 300 includes the image forming apparatus 100 and the sheet laminator 50. The image forming apparatus 100 includes, for example, the image forming device 115, a body feed tray 112, a fixing device 120, a document feeder 110, and a document reading device 102.

The sheet laminator 50 includes, for example, a unit feed tray 11, a sheet separator 1, a sheet lamination device 51, a first output tray 13, a bypass ejection pass K7 (see FIG. 2), and a second output tray 14.

An operation display panel 49 as an operation display unit, which displays various kinds of data of the image forming system 300 and through which various kinds of commands are input, is installed on an exterior portion of the image forming system 300.

The sheet separator 1 separates a portion of a two-ply sheet PJ in which a first sheet P1 and a second sheet P2 are superposed and bonded together at one end of the two-ply sheet PJ as a bonding portion A of the two-ply sheet PJ (see FIGS. 12A, 12B, 12C, 12D, and 12E and other drawings). The sheet separator 1 includes, for example, a winding roller 20, a third conveyance roller pair 6, and a moving mechanism 30. Details of the sheet separator 1 are described below, with reference to FIG. 2 and other drawings.

The unit feed tray 11 functions as a first sheet feeder to feed the two-ply sheet PJ toward the sheet separator 1. A lamination sheet that includes at least two sheets, which can be thermally bonded with each other, is used as the two-ply sheet PJ.

The sheet lamination device 51 performs lamination processing on the two-ply sheet PJ while an inner sheet PM is inserted between two sheets, which are the first sheet P1 and the second sheet P2, separated from each other by the sheet separator 1. In other words, the sheet lamination device 51 applies heat and pressure on the portion of the two sheets, i.e., the first sheet P1 and the second sheet P2 constructing the two-ply sheet PJ, to bond the two sheets together while the inner sheet PM on which a desired image has been printed by the image forming apparatus 100 as described below. The sheet lamination device 51 is disposed downstream from the sheet separator 1 in the sheet conveyance direction, i.e., downstream in the forward direction and the left side in FIG. 2. The sheet lamination device 51 includes multiple thermal pressure roller pairs 51*a* that apply heat and pressure to the two-ply sheet PJ while conveying the two-ply sheet PJ in the forward direction with the inner sheet PM inserted in the two-ply sheet PJ. A fourth conveyance path K6 is disposed between the third conveyance roller pair 6 and the sheet lamination device 51.

A heater 51*b* as an example of a heating unit for lamination processing is disposed inside each of the thermal pressure roller pairs 51*a* of the sheet lamination device 51. A lamination controller 200 (see FIG. 1) controls to heat the heaters 51*b* as the heating units. By so doing, the thermal pressure roller pairs 51*a* are heated due to radiation heat generated by the heating of the heaters 51*b*. The lamination processing is performed on the two-ply sheet PJ, in which the inner sheet PM is inserted, by the heated thermal pressure roller pairs 51*a*.

The first output tray 13 as an example of an output tray on which the two-ply sheet PJ with the inner sheet PM inside the two-ply sheet PJ, which has gone through the lamination processing, is stacked when the two-ply sheet PJ is ejected from the sheet laminator 50 or the image forming apparatus 100.

The sheet separator 1, the unit feed tray 11, the sheet lamination device 51, the first output tray 13, and the second output tray 14 are integrated as a single device as the sheet laminator 50. The sheet laminator 50 is installed outside the image forming apparatus 100 such that the sheet laminator 50 is exposed to the outside in the inner body of the image forming apparatus 100. Accordingly, the two-ply sheet PJ with the inner sheet PM inside the two-ply sheet PJ that has gone through the lamination processing can be directly taken out from the first output tray 13.

By contrast, the body feed tray 112 is detachably attached to the image forming apparatus 100. The body feed tray 112 functions as a second sheet feeder to feed the inner sheet PM toward the image forming device 115. The inner sheet PM is a sheet such as a sheet of paper to be inserted between two sheets, i.e., the first sheet P1 and the second sheet P2 of the two-ply sheet PJ with the portion of the two-ply sheet PJ separated in the sheet separator 1.

The image forming device 115 of the image forming apparatus 100 forms an image as a toner image on the surface of the inner sheet PM to be printed. The inner sheet PM is fed from the body feed tray 112, i.e., the second sheet feeder, and is conveyed in a predetermined sheet conveyance direction, which is a direction indicated by the arrow with a broken line in FIG. 1. The image forming device 115 includes, for example, multiple image forming units 104Y, 104M, 104C, and 104K. In particular, the image forming apparatus 100 according to the present embodiment forms an image with toner, i.e., dry toner, on the surface of the inner sheet PM. In other words, the image forming apparatus 100 according to the present embodiment is an electrophotographic image forming apparatus.

The fixing device 120 fixes an image on the surface of the conveyed inner sheet PM or a sheet P. Specifically, the fixing device 120 is disposed downstream from the image forming device 115 in the sheet conveyance direction in which the inner sheet PM is conveyed and fixes an image, i.e., a toner image formed on the surface of the inner sheet PM, to the inner sheet PM. The fixing device 120 includes, for example, a fixing roller 121 in which a fixing heater 123 is disposed inside the fixing roller 121 and a pressure roller 122, which presses against the fixing roller 121 to form a fixing nip. The fixing device 120 heats and presses the toner image on the surface of the inner sheet PM that is conveyed to the fixing nip, to fix the toner image to the surface of the inner sheet PM.

As illustrated in FIG. 1, in the present embodiment, the sheet laminator 50, which includes the sheet separator 1 and the sheet lamination device 51, is disposed downstream from the image forming apparatus 100 in the sheet conveyance direction in which the inner sheet PM is conveyed. To be more specific, the sheet laminator 50 is disposed so as to receive the inner sheet PM ejected from an ejection roller pair 131 of the image forming apparatus 100.

Then, in the image forming system 300 according to the present embodiment, the two-ply sheet PJ that is fed from the unit feed tray 11 is conveyed to the sheet separator 1 without passing through the image forming apparatus 100. Specifically, the two-ply sheet PJ that is fed from the unit feed tray 11 is conveyed to the sheet separator 1 without passing through the image forming device 115 and the fixing device 120 as an example of a heat source. To be more specific, the two-ply sheet PJ does not pass through the inner body of the image forming apparatus 100 and is directly conveyed from the unit feed tray 11 toward the sheet separator 1 inside the sheet laminator 50.

Such a configuration as described above allows the image forming apparatus 100 to be reduced in size compared with a case in which a sheet separator is disposed and a space for temporarily retaining the inner sheet PM on which an image has been formed is disposed inside the image forming apparatus 100.

Further, an operation to feed the inner sheet PM from the body feed tray 112 and form an image on the inner sheet PM is performed concurrently with an operation in which the two-ply sheet PJ is fed from the unit feed tray 11 and separated. Accordingly, the time that takes to finish inserting the inner sheet PM into the two-ply sheet PJ is reduced. Thus, the print productivity of the image forming system 300 can be enhanced.

The two-ply sheet PJ does not pass through the fixing device 120, i.e., the heat source. The two-ply sheet PJ receives the inner sheet PM that has passed through the fixing device 120 in which an image on the surface of the inner sheet PM has been fixed to the inner sheet PM with the portion of the two-ply sheet PJ is separated by the sheet separator 1. Accordingly, the portion of the two-ply sheet PJ is not bonded together before the inner sheet PM is inserted into the two-ply sheet PJ. Thus, sheet separation failure of the two-ply sheet PJ can be prevented.

In the present embodiment, as described above, a mode, in which the inner sheet PM is inserted into the two-ply sheet PJ to perform the sheet lamination processing, may also be referred to simply as a sheet lamination mode. Apart from the sheet lamination mode, a normal print mode is also selectable.

The normal print mode is a control mode in which the image forming device 115 forms, i.e., prints an image on a front surface of the sheet P such as a sheet of paper fed from the body feed tray 112, i.e., the second feed unit, without feeding the two-ply sheet PJ from the unit feed tray 11, i.e., the first feed unit. Subsequently, the sheet P is ejected from the image forming apparatus 100 via the fixing device 120, i.e., the heat source, without performing the lamination processing.

Figure 13:
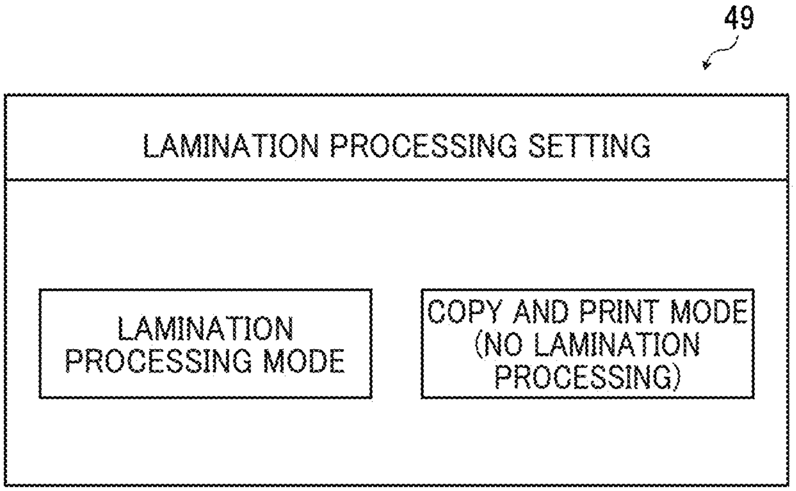
FIG. 13 is a diagram illustrating a display on an operation display panel, according to an embodiment of the present disclosure.

In the present embodiment, a display screen as illustrated in FIG. 13 is manually opened on the operation display panel 49. The button of a copy/print mode is pressed when the normal print mode is performed, and the button of the lamination mode is pressed when the lamination mode is performed. When the normal print mode is performed, the sheet P that is ejected from the image forming apparatus 100 and conveyed to the sheet laminator 50 is guided to the bypass ejection path K7 as an example of a sheet ejection path, by a separating claw 18 (see FIG. 2). Then, the sheet P is ejected from the sheet laminator 50 as is without passing through the sheet separator 1 and the sheet lamination device 51 and placed on the second output tray 14.

The bypass ejection path K7 is disposed in the sheet laminator 50 as described above. By so doing, the size of the image forming apparatus 100 can be reduced compared with a case in which the bypass ejection path K7 is disposed in the image forming apparatus 100.

A description is now given of an image forming operation, i.e., printing operation, of the image forming apparatus 100 of the image forming system 300 below with reference to FIG. 1.

In the image forming apparatus 100, first, a document D is conveyed, i.e., fed from a document table in the direction indicated by the arrow in FIG. 1 by conveyance rollers of the document feeder 110, and passes over the document reading device 102. At this time, the document reading device 102 optically reads visual data of the document D passing over the document reading device 102.

The optical visual data that has been read by the document reading device 102 is converted into an electrical signal and then transmitted to the writing device 103. Then, the writing device 103 emits laser light based on the electrical signal of the visual data toward photoconductor drums 105Y, 105M, 105C, and 105K for each color, and an exposure process is performed.

In the image forming apparatus 100, a charging process, the exposure process, and a development process are sequentially performed on the photoconductor drums 105Y, 105M, 105C, and 105K of respective image forming units 104Y, 104M, 104C, and 104K to form desired images on the photoconductor drums 105Y, 105M, 105C, and 105K, respectively.

Subsequently, the images formed on the photoconductor drums 105Y, 105M, 105C, and 105K are superimposed on top of one another and transferred onto an intermediate transfer belt 178 as a color image. The color image that has been formed on the intermediate transfer belt 178 is transferred onto the surface of the sheet P, which is to be used as the inner sheet PM and fed and conveyed by a feed roller 197 from the body feed tray 112, i.e., the second sheet feeder, at a position at which the intermediate transfer belt 178 faces a secondary transfer roller 189.

Subsequently, the sheet P, i.e., the inner sheet PM, onto which the color image has been transferred, is conveyed to the position of the fixing device 120. The fixing device 120 fixes the transferred color image formed on the surface of the sheet P, to the sheet P.

Subsequently, the sheet P is then ejected from the image forming apparatus 100 by the ejection roller pair 131 and is fed into the sheet laminator 50 as the inner sheet PM. At this time, when the sheet laminator 50 receives the inner sheet PM, the sheet laminator 50 has substantially completed the operation described below with reference to FIGS. 6A to 9C, i.e., an operation to separate the two-ply sheet PJ. Then, an operation described with reference to FIGS. 10A, 10B, and 10C, i.e., the operation to insert the inner sheet PM into the two-ply sheet PJ, is performed after the sheet laminator 50 receives the inner sheet PM. Further, after the sheet lamination device 51 completed the lamination processing of the two-ply sheet PJ into which the inner sheet PM inserted, the ejection roller pair 7 ejects the two-ply sheet PJ to the outside the sheet laminator 50 to stack the two-ply sheet PJ on the first output tray 13.

As described above, a series of image forming processes, i.e., the printing operation, of the image forming apparatus 100 and a series of sheet separating processing of the two-ply sheet PJ and the lamination processing of the inner sheet PM on which the image has been formed are completed.

The operation of the sheet laminator 50 in the lamination mode has been described above. The operation of the sheet laminator 50 in the normal print mode is substantially similar to the lamination mode, except that the lamination processing is not performed on the sheet P in the sheet laminator 50 and the sheet P is ejected via the bypass ejection path K7 to the second output tray 14.

Figure 2:
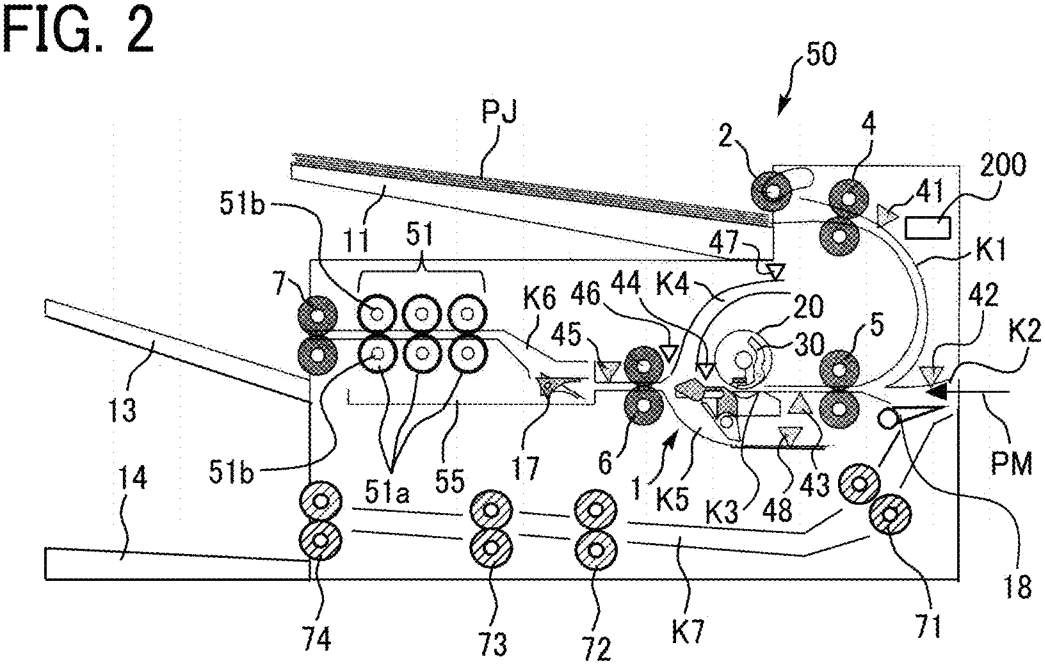
FIG. 2 is a diagram illustrating a configuration of a sheet laminator of the image forming system of FIG. 1.

A description is now given of an overall configuration and operations of the sheet laminator 50 according to an embodiment of the present disclosure, with reference to FIG. 2. FIG. 2 is a diagram illustrating the configuration of the sheet laminator 50 of the image forming system 300.

The sheet laminator 50 includes, for example, the unit feed tray 11 to serve as the first sheet feeder, the sheet separator 1, the sheet lamination device 51, the second output tray 14, and a third output tray 55.

The sheet separator 1 separates the portion of the two-ply sheet PJ in which two sheets, i.e., the first sheet P1 and the second sheet P2, are superposed and bonded together at one end of the two-ply sheet PJ in the sheet conveyance direction as a bonding portion A of the two-ply sheet PJ (see FIGS. 12A, 12B, 12C, 12D, and 12E and other drawings).

In particular, in embodiments of the present disclosure, the two-ply sheet PJ includes the first sheet P1 and the second sheet P2 superposed and bonded together at one side of the four sides of the first sheet P1 and the second sheet P2 as the bonding portion A. In other words, only the one ends, i.e., of the first sheet P1 and the second sheet P2, which correspond to the bonding portion A, are bonded and attached by, e.g., thermal welding in the two-ply sheet PJ including the first sheet P1 and the second sheet P2. The other ends of the first sheet P1 and the second sheet P2 are not bonded together. As the first sheet P1 and the second sheet P2 of the two-ply sheet PJ, a transparent film sheet, i.e., a lamination sheet, may be employed.

The sheet separator 1 separates the first sheet P1 and the second sheet P2 of the two-ply sheet PJ from each other at the ends of the first sheet P1 and the second sheet P2 opposite the bonding portion A while maintaining bonding of the first sheet P1 and the second sheet P2 of the two-ply sheet PJ at the bonding portion A. Subsequently, the sheet separator 1 inserts an inner sheet PM between the separated two sheets, i.e., the first sheet P1 and the second sheet P2 of the two-ply sheet PJ. The inner sheet PM is a sheet including at least one plain paper or a photograph.

As illustrated in FIG. 2, the sheet laminator 50 includes, for example, the unit feed tray 11, a feed roller 2, a first conveyance roller pair 4, a second conveyance roller pair 5, a third conveyance roller pair 6, the first output tray 13, the third output tray 55, the sheet lamination device 51, a first sensor 41, a second sensor 42, a third sensor 43, a fourth sensor 44, a fifth sensor 45, a sixth sensor 46, a seventh sensor 47, an eighth sensor 48, the winding roller 20, the moving mechanism 30, separation claws 16 as example of separators (see FIGS. 8A, 8B, 8C, 12A, 12B, 12C, 12D, and 12E, the switching claw 18, a fourth conveyance roller pair 71, a fifth conveyance roller pair 72, a sixth conveyance roller pair 73, a second ejection roller pair 74, and the second output tray 14.

In addition, the sheet laminator 50 includes multiple conveyance paths such as a first conveyance path K1, a second conveyance path K2, a third conveyance path K3, a first branched conveyance path K4, a second branched conveyance path K5, a fourth conveyance path K6, and the bypass ejection path K7. Each of the first sheet conveyance path K1, the second sheet conveyance path K2, the third sheet conveyance path K3, the first branched sheet conveyance path K4, the second branched sheet conveyance path K5, the fourth sheet conveyance path K6, and the bypass ejection path K7, each as an example of a guide to guide the conveyance of the sheet P and includes two conveyance guides, i.e., guide plates, facing each other.

To be more specific, the two-ply sheets PJ are stacked on the unit feed tray 11. The sheet feed roller 2 feeds an uppermost two-ply sheet PJ on the unit feed tray 11, and the first conveyance roller pair 4 conveys the uppermost two-ply sheet PJ along the first sheet conveyance path K1.

Each of the unit feed tray 11 and the feed roller 2 functions as the first sheet feeder to feed the two-ply sheet PJ. The first sheet feeder is controlled by a lamination controller 200 as a control unit (see FIG. 5). To be more specific, the lamination controller 200 drives and rotates the feed roller 2 to feed the two-ply sheet PJ from the unit feed tray 11.

In the image forming apparatus 100 according to the present embodiment, the lamination controller 200 causes the body feed tray 112, i.e., the second sheet feeder and the feed roller 197, to start feeding the inner sheet PM after the first sheet feeder feeds the two-ply sheet PJ and before the operation to separate the portion of the two-ply sheet PJ is completed.

In other words, in the present embodiment, the feeding of the two-ply sheet PJ and the feeding of the inner sheet PM are not performed separately. However, the feeding of the two-ply sheet PJ and the feeding of the inner sheet PM can be performed in a single operation as an instruction operated via the operation display panel 49. To be more specific, the button of the lamination mode on the operation display panel 49 is pressed once to start the operation. By so doing, the sheet separating operation in which the two-ply sheet PJ is fed and separated and the sheet inserting operation in which the inner sheet PM is inserted into the two-ply sheet PJ between the first sheet P1 and the second sheet P2 separated from each other are collectively performed automatically based on the single instruction.

The operation to start feeding the inner sheet PM from the body feed tray 112 is not performed after the sheet separating operation of the two-ply sheet PJ is completed. However, the operation to start feeding the inner sheet PM is performed before the sheet separating operation of the two-ply sheet PJ is completed. Such a configuration as described above allows the time to be taken for a series of steps from when the two-ply sheet PJ is fed from the unit feed tray 11 to when inserting the inner sheet PM into the two-ply sheet PJ is completed, to be reduced efficiently. Accordingly, the productivity of the image forming system 300 is enhanced. In other words, the time to be taken to perform the lamination mode is reduced.

The first conveyance roller pair 4, the second conveyance roller pair 5, the third conveyance roller pair 6, the fourth conveyance roller pair 71, the fifth conveyance roller pair 72, the sixth conveyance roller pair 73, the first ejection roller pair 7, and the second ejection roller pair 74 each includes a driving roller and a driven roller and conveys a two-ply sheet PM nipped at a nip between the driving roller and the driven roller. The third conveyance path K3 includes the second conveyance roller pair 5, the winding roller 20, and the third conveyance roller pair 6 in the order listed from upstream to downstream in the sheet conveyance direction. In particular, the winding roller 20 and the third conveyance roller pair 6 are rotatable in the forward direction or in a reverse direction opposite to the forward direction. The third conveyance roller pair 6 conveys the two-ply sheet PJ in the forward direction, which is the leftward direction in FIG. 2, and in the reverse direction, which is the rightward direction in FIG. 2. The third conveyance roller pair 6 also functions as a sheet conveyance roller pair to convey the two-ply sheet PJ to the sheet lamination device 51 or to the third output tray 55. The first ejection roller pair 7 functions as a sheet conveyance roller pair to convey and eject the two-ply sheet PJ on which the lamination processing has been performed, i.e., the two-ply sheet PJ into which the inner sheet PM has been inserted, toward the first output tray 13.

A switching claw 17 is disposed downstream from the third conveyance roller pair 6 in the forward direction, which is the leftward direction in FIG. 2. The switching claw 17 switches the direction of conveyance of the two-ply sheet PJ, for example, by conveying the two-ply sheet PJ toward the sheet lamination device 51 or toward the third output tray 55. The switching claw 17 is controlled in accordance with the mode manually selected to switch the direction of conveyance of the two-ply sheet PM and the output tray to which the two-ply sheet PM is ejected.

The third output tray 55 is a tray for stacking the two-ply sheets PM which have failed to be separated in the sheet separating processing or the sheet insertion processing in the sheet separator 1.

The separating claw 18 is disposed on the second conveyance path K2 into which the inner sheet PM is fed from the image forming apparatus 100. The separating claw 18 switches the direction of conveyance of the inner sheet PM between a conveyance path toward the third conveyance path K3 and a conveyance path toward the bypass ejection path K7. The switching claw 18 is controlled in accordance with the mode manually selected to switch the direction of conveyance of the inner sheet PM and directions in which the inner sheet PM is ejected.

Specifically, when the lamination print mode in which the lamination processing is performed is selected, the inner sheet PM that is sent into the second conveyance path K2 is guided to the third conveyance path K3 by the separating claw 18. Alternatively, when the normal print mode in which the lamination processing is not performed is selected, the inner sheet PM that is sent into the second conveyance path K2 is guided to the bypass ejection path K7 by the separating claw 18.

On the bypass ejection path K7, the fourth conveyance roller pair 71, the fifth conveyance roller pair 72, the sixth conveyance roller pair 73, and the second ejection roller pair 74 are arranged in the order listed from upstream to downstream in the sheet conveyance direction.

Each of the first sensor 41, the second sensor 42, the third sensor 43, the fourth sensor 44, and the fifth sensor 45 is an example of reflective photosensor to optically detect whether a sheet is present at the respective positions. The first sensor 41 is disposed near the first conveyance roller pair 4 at a position downstream from the first conveyance roller pair 4 in the sheet conveyance direction. The second sensor 42 is disposed near the ejection roller pair 131 (see FIG. 1) at a position downstream from the ejection roller pair 131 in the sheet conveyance direction. The third sensor 43 is disposed near the second conveyance roller pair 5 at a position downstream from the second conveyance roller pair 5 in the sheet conveyance direction. The fourth sensor 44 is disposed near the winding roller 20 at a position downstream from the winding roller 20, which is the left side of the winding roller 20 in FIG. 2, and upstream from the third conveyance roller pair 6 in the sheet conveyance direction, which is the right side of the third conveyance roller pair 6 in FIG. 2. The fifth sensor 45 is disposed near the third conveyance roller pair 6 at a position downstream from the third conveyance roller pair 6 in the sheet conveyance direction, which is the left side of the third conveyance roller pair 6 in FIG. 2.

Figure 3A:
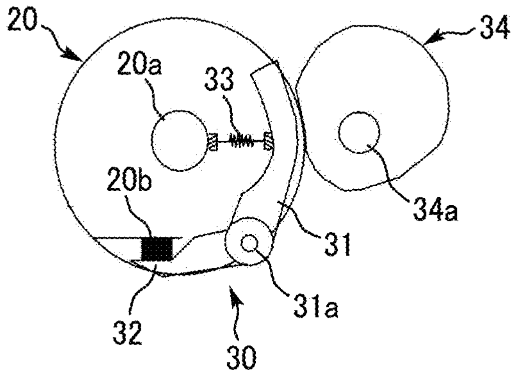
FIG. 3A is a side view of a gripper when the gripper is moved to a gripping position, according to an embodiment of the present disclosure.
Figure 3B:
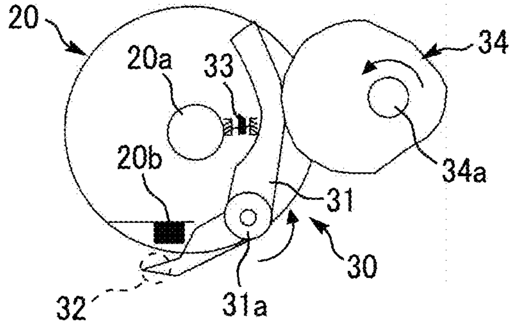
FIG. 3B is a side view of the gripper of FIG. 3A when the gripper is moved to a retracted position at which the gripper is retracted from the gripping position.
Figure 4A:
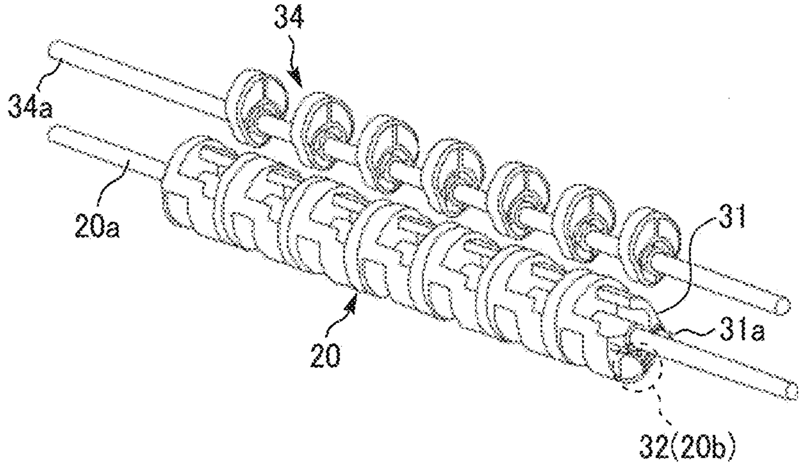
FIG. 4A is a perspective view of a moving mechanism when grippers are moved to respective gripping positions, according to an embodiment of the present disclosure.
Figure 4B:
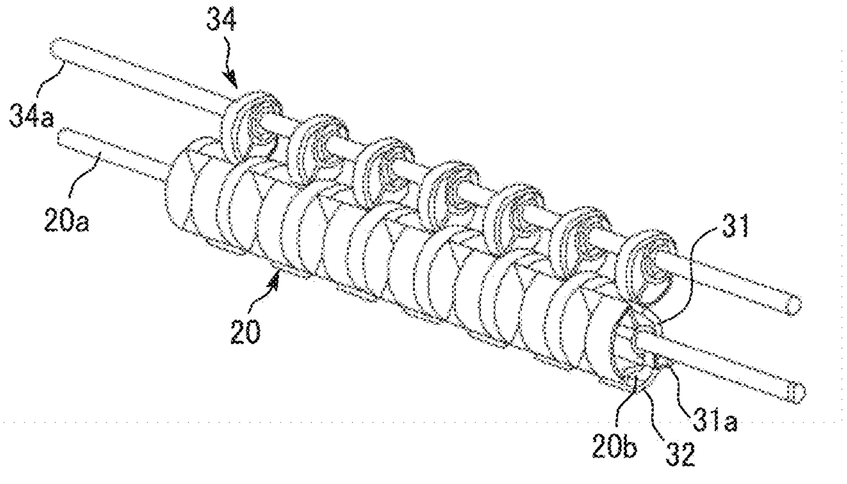
FIG. 4B is a perspective view of the moving mechanism of FIG. 4A when the grippers are moved to respective released positions, according to an embodiment of the present disclosure.
Figure 7A:
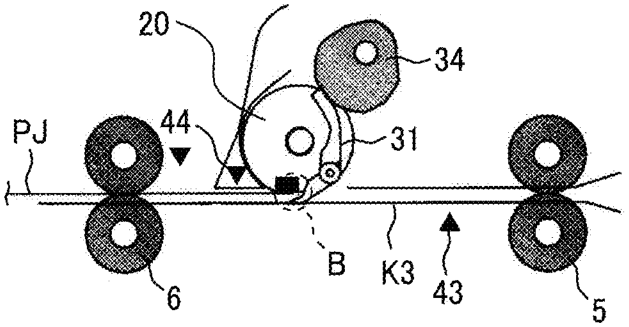
FIGS. 7A, 7B, 7B', 7C, 7C', and 7D are diagrams each illustrating an operation of the sheet separator of FIGS. 6A, 6B, 6C, and 6D, followed by the operation illustrated in FIGS. 6A, 6B, 6C, and 6D.

A description is now given of the winding roller 20, with reference to FIGS. 3A, 3B, 4A, 4B, 7B, 7B', 7C, 7C', 7D, and 8A and other drawings. FIG. 3A is a side view of a gripper 32 when the gripper 32 is moved to a gripping position at which the gripper 32 can grip the two-ply sheet PJ. FIG. 3B is a side view of the gripper 32 when the gripper 32 is moved to a retracted position at which the gripper 32 is retracted from the gripping position. FIG. 4A is a perspective view of the winding roller 20 and the cam 34 when the gripper 32 is moved to the gripping position. FIG. 4B is a perspective view of the winding roller 20 and the cam 34 when the gripper 32 is moved to the retracted position. FIGS. 7A, 7B, 7C, and 7D are diagrams each illustrating the winding roller 20 and components around the winding roller 20 viewed from the lateral side of the winding roller 20, when the sheet separating operation is performed. FIGS. 8A, 8B, and 8C are diagrams each illustrating the winding roller 20 and components around the winding roller 20 viewed from the lateral side of the winding roller 20, when the sheet separating operation subsequent to the sheet separating operation of FIGS. 7A, 7B, 7C, and 7D is performed. The winding roller 20 is rotatable in forward and reverse directions about a rotary shaft 20*a* by the driving of a drive motor controlled by a controller 350.

Specifically, the two-ply sheet PJ is fed from the unit feed tray 11 and passes through the first conveyance path K1, and the second conveyance roller pair 5 conveys the two-ply sheet PJ in the forward direction along the third conveyance path K3. The two-ply sheet passes through a winding start position W of the winding roller 20 once and is conveyed to a position of the third conveyance roller pair 6, which is a position at which the trailing end of the two-ply sheet PJ passes through the fourth sensor 44 and stops at a position in front of the third conveyance roller pair 6. Subsequently, the third conveyance roller pair 6 rotates in reverse to convey the two-ply sheet PJ in the reverse direction to the position of the winding roller 20, i.e., the winding start position W, and the gripper 32 grips the trailing end of the two-ply sheet PJ. The two-ply sheet PJ is further conveyed with the trailing end of the two-ply sheet PJ gripped by the gripper 32, and the winding roller 20 rotates in the counterclockwise direction in FIG. 2 to wind the two-ply sheet PJ about the winding roller 20.

When the two-ply sheet PJ is wound around the winding roller 20, the length of the two-ply sheet PJ wound around the winding roller 20 is proportional to the radius of the winding roller 20. For this reason, the first sheet P1 is nearer to the circumferential surface of the winding roller 20 than the second sheet P2. Accordingly, as illustrated in FIG. 7C', the length of the first sheet P1 wound around the winding roller 20 is shorter than the length of the second sheet P2 wound around the winding roller 20. For this reason, misalignment occurs in a part of the two-ply sheet PJ in which the first sheet P1 is in close contact with the second sheet P2, i.e., a part in which the first sheet P1 sticks to the second sheet P2, other than the bonding portion A and the gripped portion B. The misalignment causes the first sheet P1 to slack and bend toward the second sheet P2. Accordingly, a gap C is formed between the first sheet P1 and the second sheet P2, in the vicinity of the bonding portion A of the two-ply sheet PJ, as illustrated in FIGS. 7D and 8A. In other words, when an end of the first sheet P1 placed on the second sheet P2 bends upward, the gap C is formed between the first sheet P1 and the second sheet P2 in the vicinity of the bonding portion A of the two-ply sheet PJ. As described above, the first sheet P1 and the second sheet P2 that are in close contact with each other without any gap are peeled off and separated from each other.

In particular, in the present embodiment, in order to significantly form the gap C as described above, in other words, in order to increase the difference between the length of the first sheet P1 wound around the winding roller 20 and the length of the second sheet P2 wound around the winding roller 20, the two-ply sheet PJ is wound around the winding roller 20 at least one round.

As described above, in the present embodiment, the winding roller 20 around which the two-ply sheet PJ is wound is disposed inside the sheet laminator 50. Accordingly, the two-ply sheet PJ can be separated without significantly increasing the size and cost of the sheet laminator 50.

Figure 7B:
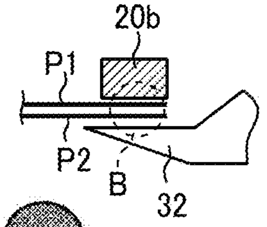
Figure 7B:
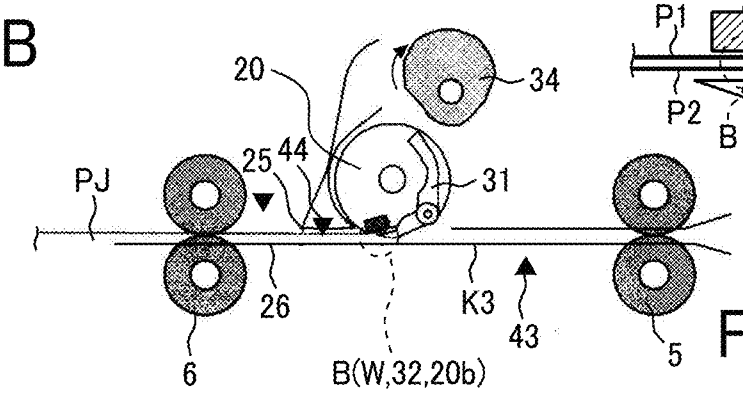
Figure 7C:
Figure 7C:
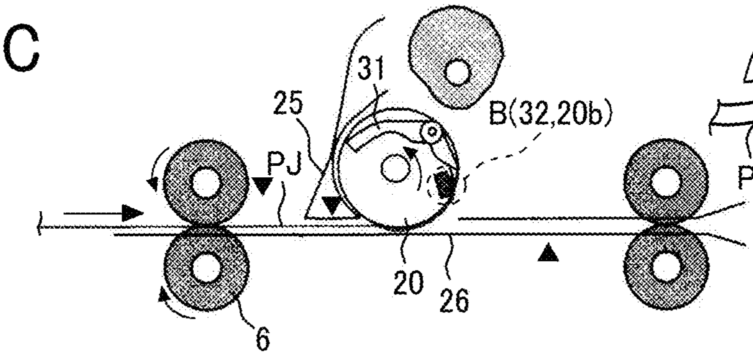
Figure 7D:
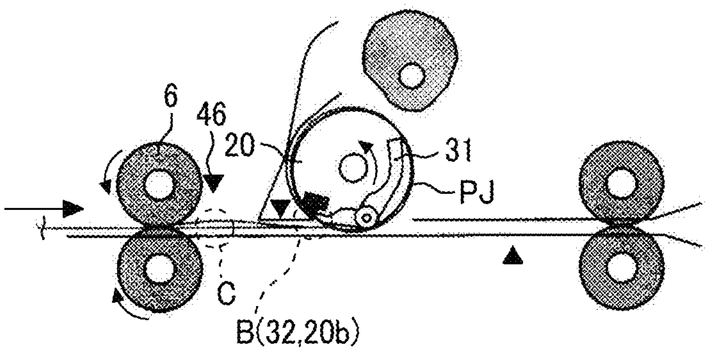
Figure 8A:
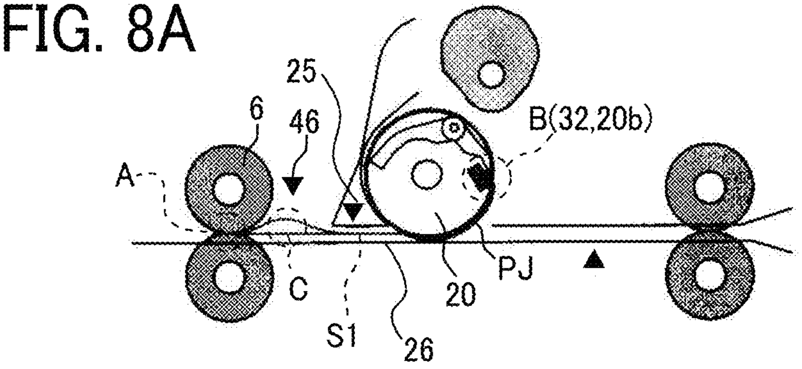
FIGS. 8A, 8B, and 8C are diagrams each illustrating an operation of the sheet separator of FIGS. 6A, 6B, 6C, and 6D, followed by the operation illustrated in FIGS. 7A, 7B, 7B', 7C, 7C', and 7D.
Figure 8B:
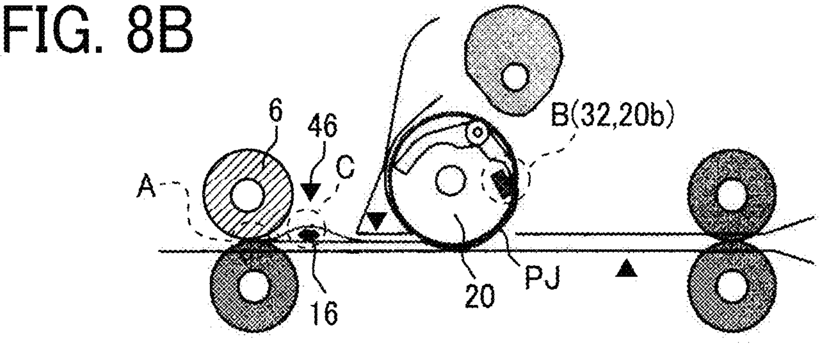
Figure 8C:
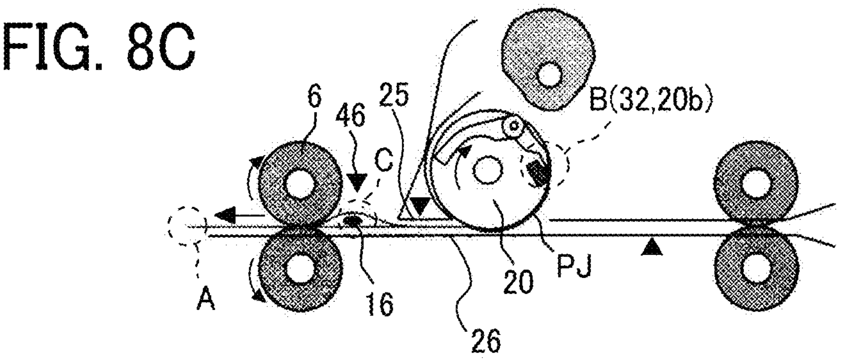

As illustrated in FIG. 7B', the gripper 32 of the present embodiment grips the gripped portion B of the two-ply sheet PJ without contacting the end face of the other end of the two-ply sheet PJ closer to the gripped portion B.

More specifically, the gripper 32 nips and grips the gripped portion B of the two-ply sheet PJ between the gripper 32 and a receiving portion 20*b* of the winding roller 20 without causing any component to contact the end face of the other end of the two-ply sheet PJ, in other words, without causing any component to contact the end face of the other end of the two-ply sheet PJ. The receiving portion 20*b* of the winding roller 20 is formed on the outer circumferential surface of the winding roller 20 and is arranged to be exposed outwardly and face the gripper 32.

More specifically, the two-ply sheet PJ is not sandwiched and gripped between the gripper 32 and the receiving portion 20*b* with the end faces of the other end of the two-ply sheet PJ contacting a specific component such as the gripper 32, but is sandwiched and gripped between an outer portion of the gripper 32 and an inner portion of the receiving portion 20*b* with the end faces of the other end of the two-ply sheet PJ not contacting any component.

Such a configuration as described above can prevent the two-ply sheet PJ, particularly, the end faces of the two-ply sheet PJ, from being damaged, compared to the case in which the end faces of the other end of the two-ply sheet PJ contact a component such as the gripper 32. In particular, once the end faces of the two-ply sheet PJ are damaged, it is difficult to perform the lamination processing on the damaged end faces even if the sheet laminator 50 tries to perform the lamination processing on the damaged end faces. For this reason, the configuration of embodiments of the present disclosure is useful.

In the present embodiment, the bonding portion A of the two-ply sheet PJ wound around the winding roller 20 is the one end of the two-ply sheet PJ, opposite to the other end of the two-ply sheet PJ, i.e., the gripped portion B.

In the present embodiment, at least the gripper 32 that serves as a gripper or the receiving portion 20*b* is made of elastic material such as rubber.

Such a configuration as described above enhances the gripping force to grip the two-ply sheet PJ and prevents the surfaces of the two-ply sheet PJ from being less likely to be damaged, compared with a configuration in which the gripper 32 and the receiving portion 20*b* have rigid bodies made of such as metal or resin. In particular, when both the gripper 32 and the receiving portion 20*b* are made of elastic material, such effects as described above can be obtained substantially.

As illustrated in FIGS. 3A, 3B, 4A, and 4B, the moving mechanism 30 moves the gripper 32 between the gripping position, i.e., the position illustrated in FIGS. 3A and 4A, at which the gripper 32 can grip the two-ply sheet PJ and the retracted position, i.e., the position illustrated in FIGS. 3B and 4B, at which the gripper 32 is retracted from the gripping position.

Figure 5:
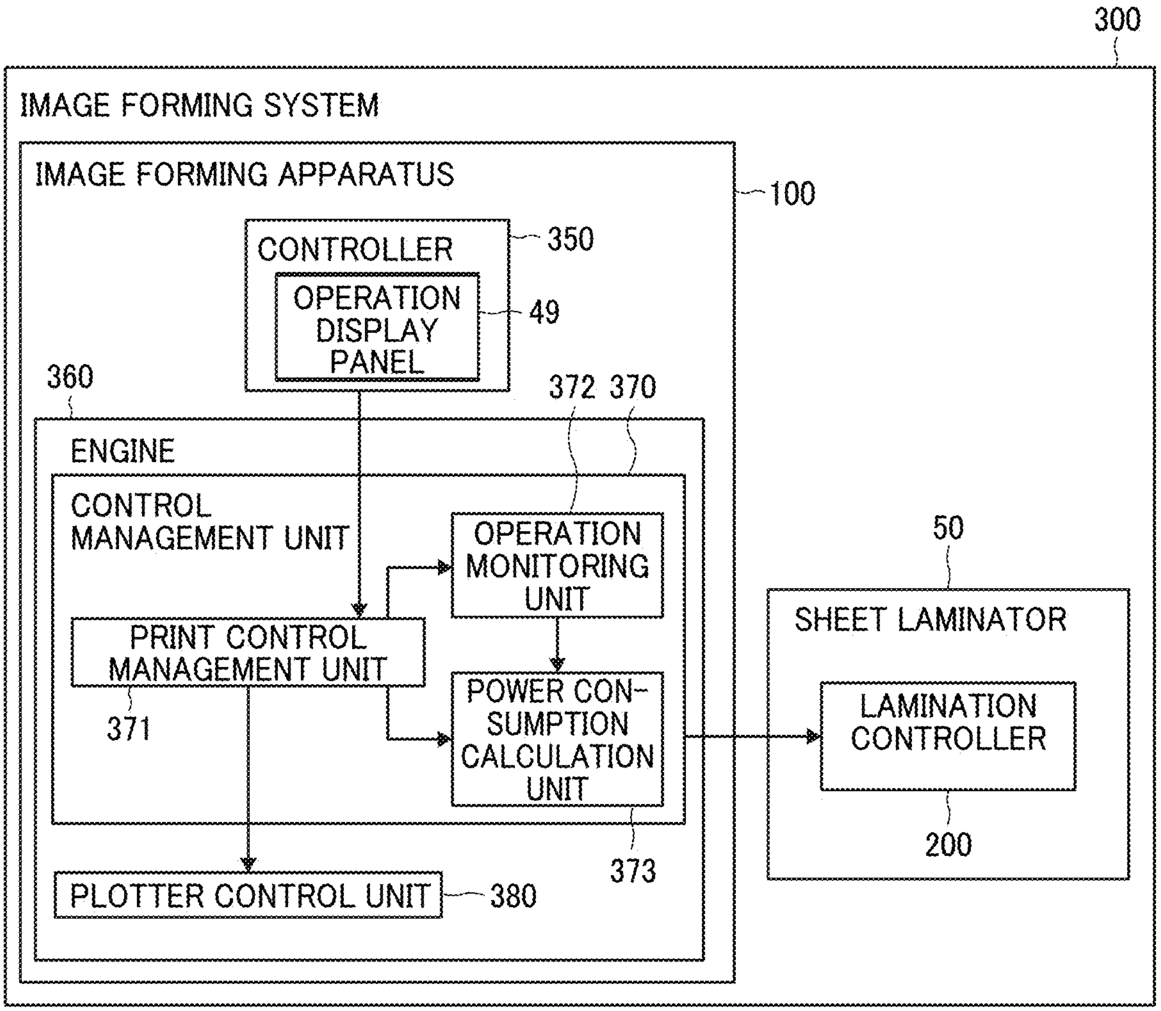
FIG. 5 is a block diagram of a control system of the image forming system of FIG. 1, according to an embodiment of the present disclosure.

Specifically, the moving mechanism 30 includes, for example, an arm 31, a compression spring 33, a cam 34, and a cam motor 205 (see FIG. 5). The compression spring 33 functions as a biasing member. The cam motor 205 drives to rotate the cam 34 in the forward direction or the reverse direction.

The arm 31 holds the gripper 32. The arm 31 and the gripper 32 are held together by the winding roller 20 to be rotatable together around a support shaft 31*a*. In the present embodiment, the gripper 32 is coupled to an end of the arm 31 such that the gripper 32 and the arm 31 are integrated and held as a single unit. Alternatively, the gripper 32 and the arm 31 may be made as separate components, and the gripper 32 may be disposed and held on the arm 31. In any case, the arm 31 that holds the gripper 32 rotates around the rotary shaft 20*a* together with the winding roller 20.

The compression spring 33 functions as a biasing member that biases the arm 31 such that the gripper 32 moves from the retracted position illustrated in FIG. 3B to the gripping position illustrated in FIG. 3A. To be more specific, one end of the compression spring 33 is coupled to a fixed position near the rotary shaft 20*a*, and the other end of the compression spring 33 is coupled to one end of the arm 31, which is an end of the arm 31 on the other end coupled to the gripper 32 with respect to the support shaft 31*a*.

The cam 34 pushes the arm 31 against the biasing force of the compression spring 33, i.e., the biasing member, such that the gripper 32 moves from the gripping position illustrated in FIG. 3A to the retracted position illustrated in FIG. 3B. The cam motor 205 that is controlled by the controller 350 drives the cam 34 to rotate in the forward direction or the reverse direction at a desired rotation angle. The cam 34 is separated from the winding roller 20 and held by the housing of the sheet laminator 50 to be rotatable around a cam shaft 34*a*.

In the moving mechanism 30 having the above-described configuration, as illustrated in FIGS. 3A and 4A, when the cam 34 is not in contact with the arm 31, the arm 31 is biased by the compression spring 33 to press the gripper 32 against the receiving portion 20*b*, which may also be referred to simply as a closed condition in the following description. In the closed condition, the gripper 32 and the receiving portion 20*b* can grip the two-ply sheet PJ.

By contrast, as illustrated in FIGS. 3B and 4B, while the cam 34 contacts and presses the arm 31, the arm 31 rotates in the counterclockwise direction in FIG. 3B about the support shaft 31*a* against the biasing force of the compression spring 33, such that the gripper 32 separates from the receiving portion 20*b*, which may also be referred to simply as an open condition in the following description. In the open condition, the gripper 32 and the receiving portion 20*b* cannot grip the two-ply sheet PJ, in which gripping of the two-ply sheet PJ by the gripper 32 and the receiving portion 20*b* is released.

In the present embodiment, as illustrated in FIGS. 4A and 4B, the winding roller 20 includes multiple roller portions, i.e., seven roller portions separated in the axial direction of the winding roller 20. Similarly, the cam 34 includes multiple cam portions separated in the axial direction of the cam 34 such that the cam portions of the cam 34 face the respective roller portions of the winding roller 20.

As described above, the positions at which the two-ply sheet PJ is gripped are provided not in the entire area of the winding roller 20 and the cam 34 in the axial direction, but at given intervals in the axial direction of the winding roller 20 and the cam 34. By so doing, the load that is needed to grip the two-ply sheet PJ can be dispersed among the positions at the given intervals in the axial direction of the winding roller 20 and the cam 34. Such a configuration as described above is useful when a gripping force for gripping the two-play sheet PJ increases.

In the present embodiment, as illustrated in FIG. 5, the lamination controller 200 that controls various components of the sheet laminator 50 is connected to a control management unit 370 of the image forming apparatus 100.

Specifically, the image forming system 300 includes the image forming apparatus 100 and the sheet laminator 50. The image forming apparatus 100 includes the controller 350 and an engine 360. The sheet laminator 50 includes the lamination controller 200.

The controller 350 of the image forming apparatus 100 includes the operation display panel 49 as an operation panel that receives a print request. The controller 350 notifies the control management unit 370 of the engine 360 of a print request. The control management unit 370 includes, for example, a print control management unit 371, an operation monitoring unit 372, and a power consumption calculation unit 373. The control management unit 370 requests a plotter control unit 380 and the lamination controller 200 to perform control for each page requested to be printed. The plotter control unit 380 performs control to feed a sheet P, print an image on the sheet P, and eject the sheet P in response to a request from the control management unit 370. The lamination controller 200 prepares for lamination processing and controls the lamination processing such that the sheet P, i.e., an inner sheet PM, conveyed from the image forming apparatus 100 is laminated.

In the present embodiment, the print control management unit 371 of the control management unit 370 of the engine 360 receives a print request from the controller 350 and requests the operation monitoring unit 372 and the power consumption calculation unit 373 to perform control. The operation monitoring unit 372 monitors the operation of the sheet laminator 50. The power consumption calculation unit 373 acquires print data from the controller 350. At the same time, the power consumption calculation unit 373 acquires the lamination processing data from the operation monitoring unit 372 to calculate the power consumption of the image forming apparatus 100 and the sheet laminator 50.

In the present embodiment, when the lamination print mode is performed, the sum of the power consumed when the image forming apparatus 100 is started and the power consumed when the sheet laminator 50 is started is controlled so as not to exceed a predetermined upper limit, which is 1500 watts in the present embodiment, based on the data calculated by the power consumption calculation unit 373. Such a control is described in detail below with reference to, for example, FIG. 17.

The above-described controls are performed using a central processing unit (CPU) or a memory.

Figure 6A:
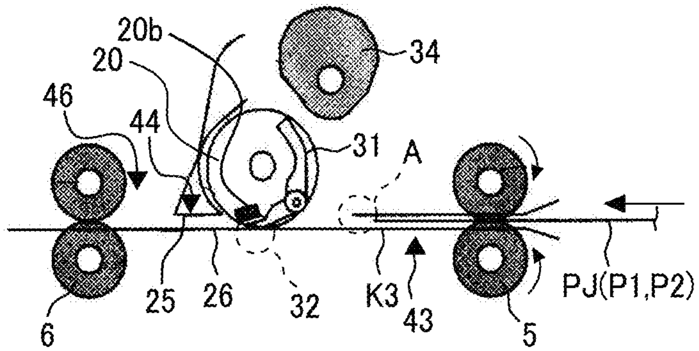
FIGS. 6A, 6B, 6C, and 6D are diagrams each illustrating an operation of a sheet separator, according to an embodiment of the present disclosure.
Figure 6B:
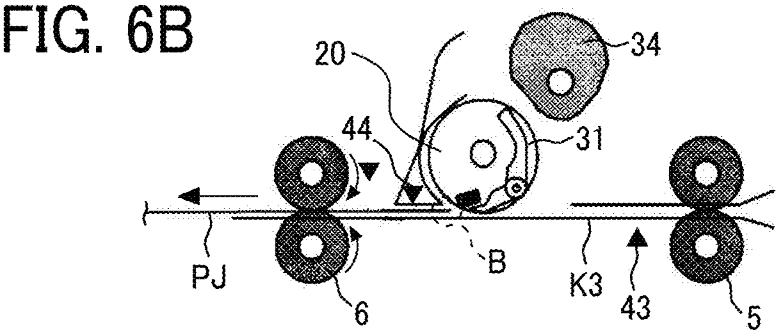
Figure 6C:
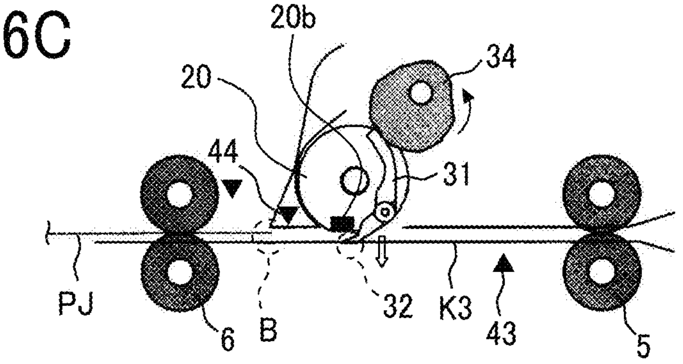
Figure 6D:
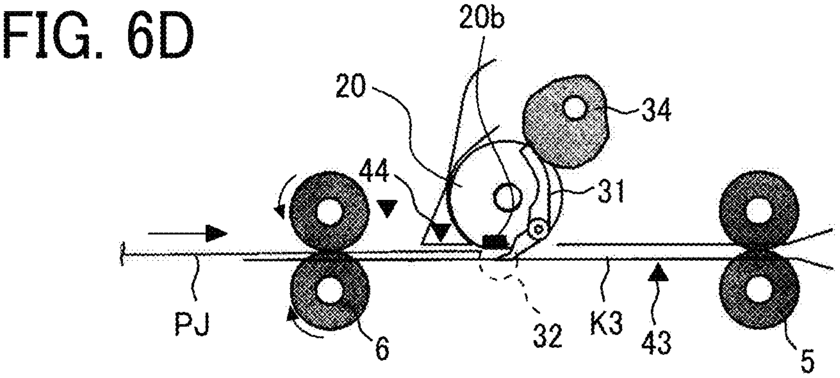

In the present embodiment, as illustrated in, for example, FIGS. 2, 6D, and 7A, the fourth sensor 44 that detects the two-ply sheet PJ conveyed between the winding roller 20 and the third conveyance roller pair 6 is disposed in the sheet laminator 50. The fourth sensor 44 detects the leading end of the two-ply sheet PJ conveyed by the third conveyance roller pair 6 toward the winding roller 20. The moving mechanism 30 is controlled based on results detected by the fourth sensor 44.

More specifically, the fourth sensor 44 is disposed on a conveyance path between the winding roller 20 and the third conveyance roller pair 6. As illustrated in FIGS. 6D and 7A, when the third conveyance roller pair 6 conveys the two-ply sheet PJ in the reverse direction toward the winding roller 20 with the gripped portion B of the two-ply sheet PJ acting as the leading end of the two-ply sheet PJ, the fourth sensor 44 detects the leading end, i.e., the leading end of the two-ply sheet PJ when conveyed in the reverse direction, of the two-ply sheet PJ. The controller 350 uses a timing at which the fourth sensor 44 detects the leading end of the two-ply sheet PJ as a trigger to adjust and control a timing to stop the two-ply sheet PJ at the gripping position and a timing at which the gripper 32 grips the gripped portion B. More specifically, after a predetermined time has elapsed from when the fourth sensor 44 detected the leading end of the two-ply sheet PJ, the conveyance of the two-ply sheet PJ in the reverse direction by the third conveyance roller pair 6 is stopped, and the cam 34 is rotated to rotate the arm 31 of the moving mechanism 30 such that the gripper 32 moves from the retracted position illustrated in FIG. 3B to the gripping position illustrated in FIG. 3A.

The above-described control accurately performs an operation in which the end faces of the two-ply sheet PJ are nipped between the gripper 32 and the receiving portion 20*b* without causing the end faces of the two-ply sheet PJ to contact any component.

As described above, the third conveyance roller pair 6 conveys the two-ply sheet PJ toward the winding start position W of the winding roller 20 on the third conveyance path K3 between the third conveyance roller pair 6 and the winding roller 20, with the other end of the two-ply sheet PJ, i.e., the gripped portion B as a leading end.

With reference to, for example, FIGS. 8A, 8B, 8C, 11, 12A, 12B, 12C, 12D, 12E, and 16, a description is now given below of the separation claws 16 that serve as separators. The separation claws 16 are claw-shaped members that move from standby positions illustrated in FIG. 16 to be inserted into the gap C formed between the first sheet P1 and the second sheet P2 at a predetermined position of the two-ply sheet PJ.

To be more specific, the separation claws 16 are inserted into the gap C formed between the first sheet P1 and the second sheet P2 at a position between the winding roller 20 and the third conveyance roller pair 6 from the standby positions at both ends of the two-ply sheet PJ in the width direction of the two-ply sheet PJ. At this time, the two-ply sheet PJ is wound by the winding roller 20 starting from the end of the two-ply sheet PJ, closer to the gripped portion B and the end of the two-ply sheet PJ closer to the bonding portion A is nipped by the third conveyance roller pair 6.

Figure 11:
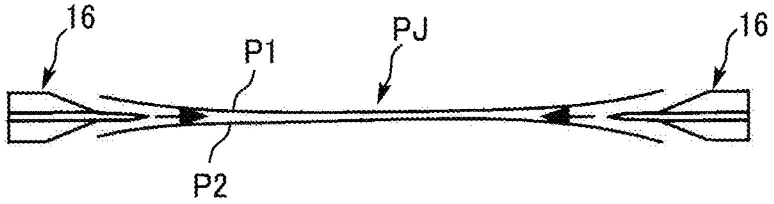
FIG. 11 is a diagram illustrating separation claws when the separation claws are inserted into a two-ply sheet in a width direction, according to an embodiment of the present disclosure.
Figure 16:
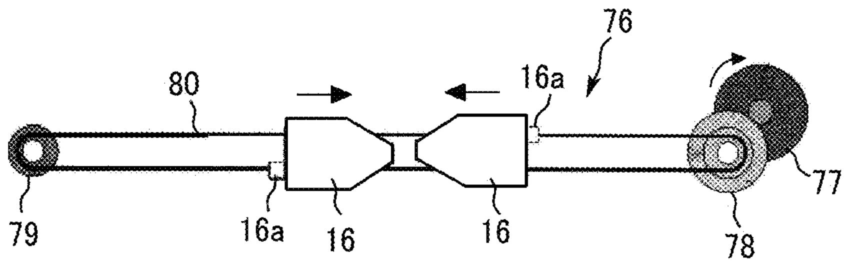
FIG. 16 is a diagram illustrating a moving mechanism of separation claws, according to an embodiment of the present disclosure.

More specifically, in the present embodiment, the separation claws 16 are disposed at both ends of the two-ply sheet PJ in the width direction, i.e., a direction perpendicular to a plane on which FIGS. 8A, 8B, and 8C are illustrated and the horizontal direction in FIGS. 11 and 16. As illustrated in FIGS. 12A, 12B, 12C, 12D, and 12E, the length of each of the separation claws 16 in the vertical direction, i.e., the thickness direction of the two-ply sheet PJ, gradually increases from the front end near the center of the two-ply sheet PJ in the width direction, to the rear end near outer portions of the two-ply sheet PJ in the width direction.

The separation claws 16 are movable in the width direction of the two-ply sheet PJ by a movement mechanism 76 (see FIG. 16) controlled by the lamination controller 200.

Figure 12A:
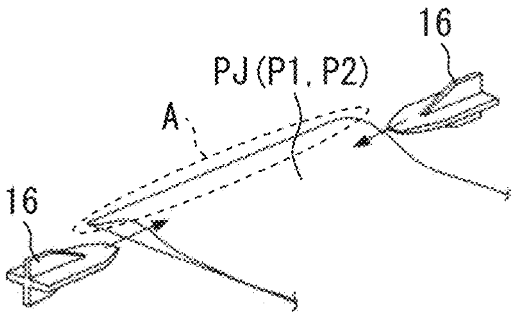
FIGS. 12A, 12B, 12C, 12D, and 12E are diagrams each illustrating an operation of the separation claws of FIG. 11.
Figure 12B:
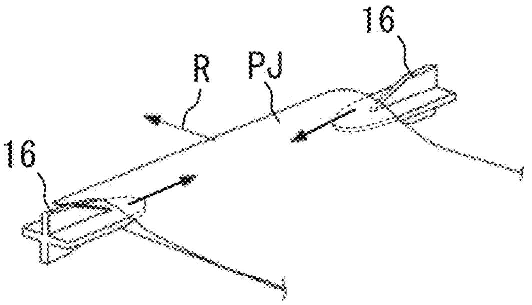

The separation claws 16 having the configuration as described above stand by at the standby positions at which the separation claws 16 do not interfere with the conveyance of a sheet such as the two-ply sheet PJ in the third sheet conveyance passage K3, when the lamination processing is not performed. As illustrated in FIG. 12A, the standby positions of the separation claws 16 are near outer portions of the two-ply sheet PJ in the width direction. As illustrated in FIGS. 11 and 12B, the separation claws 16 enter the gap C of the two-ply sheet PJ when the separation claws 16 separate the two-ply sheet PJ, i.e., the first sheet P1 and the second sheet P2. Accordingly, the separation claws 16 cause the gap C to be relatively large.

As illustrated in FIG. 16, the movement mechanism 76 that moves the pair of separation claws 16 in the width direction includes, for example, a motor 77, a gear pulley 78, a pulley 79, and a timing belt 80. The gear pulley 78 has a step-like ring shape including a gear and a pulley. The gear meshes with a motor gear mounted on the motor shaft of the motor 77. The pulley stretches and supports the timing belt 80 together with the pulley 79. One separation claw 16 of the pair of separation claws 16 includes a fixed portion 16*a* fixed to a part of the belt surface of the timing belt 80, i.e., an upper side of the belt surface in FIG. 16. The other separation claw 16 includes a fixed portion 16*a* fixed to a part of the other belt surface of the timing belt 80, i.e., a lower side of the belt surface in FIG. 16.

When the movement mechanism 76 having the configuration as described above drives to rotate the motor shaft of the motor 77 in a direction indicated by arrow in FIG. 16, i.e., the clockwise direction, the gear pulley 78 rotates counterclockwise, and the timing belt 80 rotates in the counterclockwise direction. Accordingly, the pair of separation claws 16 move from the outer portions of the two-ply sheet PJ in the width direction to the center of the two-ply sheet PJ in the width direction, i.e., in a direction in which the pair of separation claws 16 approaches each other. By contrast, when the motor shaft of the motor 77 is driven to rotate in the direction opposite to the direction indicated by the arrows in FIG. 16, the pair of separation claws 16 move from the center of the two-ply sheet PJ in the width direction toward the outer portions of the two-ply sheet PJ in the width direction, i.e., in a direction in which the pair of the separation claws 16 move away from each other.

With the separation claws 16 being inserted into the gap C of the two-ply sheet PJ, the separation claws 16 relatively move from the one end of the two-ply sheet PJ near the bonding portion A toward the other end of the two-ply sheet PJ, i.e., the gripped portion B. Then, the separation claws 16 move in the width direction between the first sheet P1 and the second sheet P2 at the other end of the two-ply sheet PJ, i.e., the gripped portion B.

Figure 12C:
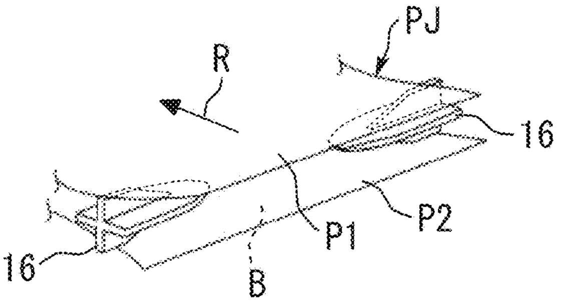
Figure 12D:
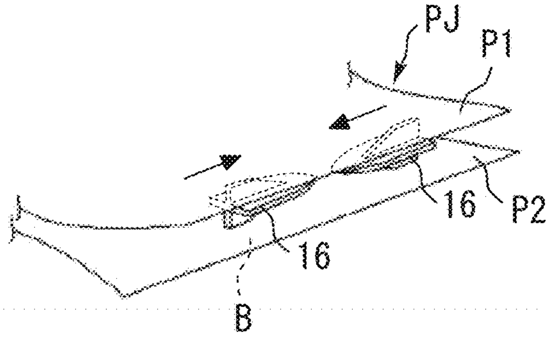

Specifically, the lamination controller 200 controls the movement mechanism 76 (see FIG. 16) to move the pair of separation claws 16 as follows. As illustrated in FIGS. 12B and 12C, with the pair of separation claws 16 being inserted into both ends of the gap C of the two-ply sheet PJ in the width direction, the pair of separation claws 16 relatively moves toward the other end of the two-ply sheet PJ closer to the gripped portion B. After the pair of separation claws 16 has moved to the other end of the two-ply sheet PJ, as illustrated in FIG. 12D, the pair of separation claws 16 on the other end of the two-ply sheet PJ moves from both ends of the two-ply sheet PJ in the width direction to the center of the two-ply sheet PJ between the first sheet P1 and the second sheet P2. The movement mechanism 76 causes the pair of separation claws 16 to move from the respective standby positions to the positions at which the separation claws 16 come close to each other to allow the pair of separation claws 16 to move as described above.

Such a mechanism as described above in which the two-ply sheet PJ is wound around the winding roller 20 and the separation claws 16 are inserted into the two-ply sheet PJ to separate the two-ply sheet PJ allows the size of the sheet laminator 50 to be reduced, compared to a mechanism in which a large-scale device such as a vacuum device is employed to separate the two-ply sheet PJ. In other words, the above-described mechanism can reliably separate the first sheet P1 and the second sheet P2 of the two-ply sheet PJ without increasing the size of the sheet laminator 50.

In particular, in the present embodiment, the separation claws 16 move substantially over the entire area of the two-ply sheet PJ in the width direction on the other end of the two-ply sheet PJ, i.e., the trailing end of the two-ply sheet PJ. Accordingly, the separation claws 16 can sufficiently peel and separate the other ends of the first sheet P1 and the second sheet P2 of the two-ply sheet PJ, with respect to the bonding portion A. As a result, problems as follows are less likely to occur. For example, the ends of the two-ply sheet PJ on the other end of the bonding portion A may not be sufficiently separated, and the inner sheet PM (see FIG. 12E) may not be inserted into the two-ply sheet PJ from the ends of the two-ply sheet PJ on the other end of the bonding portion A even if the inner sheet PM is inserted. Further, the above-described configuration allows the separation claws 16 to easily function as switchers or switching plates to separately guide the first sheet P1 and the second sheet P2 to the first branched conveyance path K4 and the second branched conveyance path K5, respectively. A description of the separation claws 16 that serve as the switchers is given below.

In the present embodiment, the separation claws 16 that serve as separators also serve as the switchers or the switching plates to guide the first sheet P1 and the second sheet P2 separated by the separation claws 16, to the first branched conveyance path K4 and the second branched conveyance path K5 branching off in different directions, respectively.

Figure 9A:
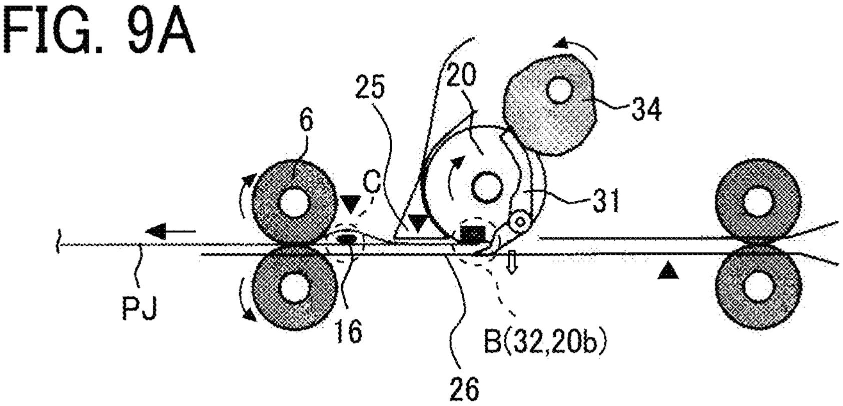
FIGS. 9A, 9B, and 9C are diagrams each illustrating an operation of the sheet separator of FIGS. 6A, 6B, 6C, and 6D, followed by the operation illustrated in FIGS. 8A, 8B, and 8C.
Figure 9B:
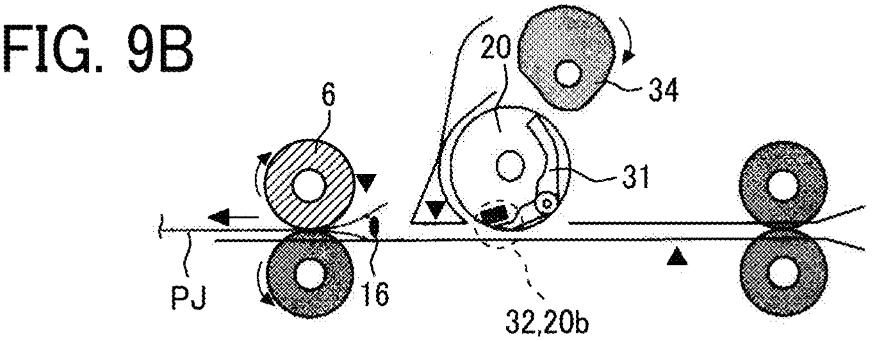
Figure 9C:
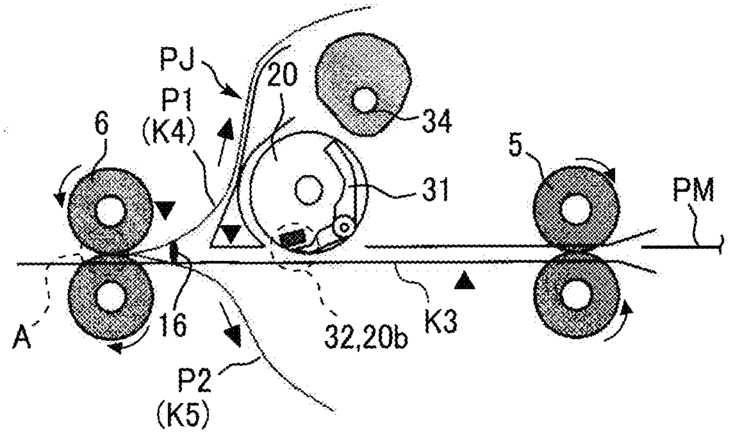

To be more specific, as illustrated in FIG. 9C, the first branched conveyance path K4 and the second branched conveyance path K5 branch off in different directions from the third conveyance path K3 between the winding roller 20 and the separation claws 16 as examples of separators. To be more specific, the first branched conveyance path K4 branches upward from the third conveyance path K3, and the second branched conveyance path K5 branches downward from the third conveyance path K3.

As illustrated in FIGS. 9A, 9B, and 9C, after the separation claws 16 are inserted into the gap C, the third conveyance roller pair 6 conveys the end, the bonding portion A, of the two-ply sheet PJ to the left side in FIGS. 9A, 9B, and 9C such that the winding of the other end of the two-ply sheet PJ on the winding roller 20 is released (see FIGS. 12A, 12B, and 12C). Subsequently, as illustrated in FIG. 12D, after the separation claws 16 move to the center of the two-ply sheet PJ in the width direction, the third conveyance roller pair 6 conveys the two-ply sheet PJ to the right side in FIGS. 9A, 9B, and 9C again while the separation claws 16 remain in the center of the two-ply sheet PJ in the width direction. Then, the separation claws 16 guide the first sheet P1 and the second sheet P2 separated by the separation claws 16, to the first branched conveyance path K4 and the second branched conveyance path K5, respectively. In other words, the first sheet P1 is guided to the first branched conveyance path K4, and the second sheet P2 is guided to the second branched conveyance path K5. Subsequently, as illustrated in FIGS. 10A, 10B, 10C, and 12E, the separation claws 16 move to the respective standby positions. Then, the conveyance roller pair 5 conveys the inner sheet PM toward the end of the third sheet conveyance passage K3, i.e., the left side in FIGS. 10A, 10B, and 10C, such that the inner sheet PM is inserted between the first sheet P1 and the second sheet P2 separated from the two-ply sheet PJ.

As described above, the separation claws 16 of the present embodiment function as separators that separate the portions of the first sheet P1 and the second sheet P2 of the two-ply sheet PJ. The separation claws 16 also function as the switchers that separately guide the first sheet P1 and the second sheet P2 that have been separated, to the first branched conveyance path K4 and the second branched conveyance path K5, respectively. Accordingly, such a configuration as described above allows the size and the cost of the sheet laminator 50 to be reduced, compared with a configuration in which the sheet laminator 50 includes a separator and a switcher as different components. Accordingly, the first sheet P1 and the second sheet P2 constituting the two-ply sheet JP can be efficiently and favorably separated.

The seventh sensor 47 optically detects whether the first sheet P1 that is peeled off from the second sheet P2 has been appropriately conveyed to the first branched conveyance path K4. The eighth sensor 48 optically detects whether the second sheet P2 that is peeled off from the first sheet P1 has been appropriately conveyed to the second branched conveyance path K5.

In the present embodiment, the separation claws 16 function as the separators and also as the switchers. However, the sheet laminator 50 according to the present embodiment may further include a component that functions as the switcher, separately from the separation claws 16 that function as the separators.

In the present embodiment, as illustrated in FIGS. 8A, 8B, and 8C, the first guide 25 is disposed between the separation claws 16 and the winding roller 20 on the third conveyance path K3. The first guide 25 functions as a restricting member to restrict the first sheet P1 from slacking, i.e., deflecting, when the first sheet P1 is wound around the winding roller 20 as an inner sheet of the first sheet P1 and the second sheet P2 of the two-ply sheet PJ.

Specifically, the first guide 25 as the restricting member is a conveyance guide disposed above an imaginary plane S1 on the third conveyance path K3 at a position close to the winding roller 20. The imaginary plane S1 is an imaginary plane that passes through the winding start position W of the winding roller 20 and the nip of the third conveyance roller pair 6 (see FIG. 8A). The first guide 25 has a substantially triangular prism shape having a plane along the outer circumferential surface of the winding roller 20. The plane covers a part of the outer circumferential surface of the winding roller 20 and is separated from the winding roller 20 by a predetermined gap. The first guide 25 functions also as a conveyance guide for the third conveyance path K3 and a conveyance guide for the first branched conveyance path K4. In other words, the first guide 25 guides a sheet conveyed on the third conveyance path K3, a sheet conveyed on the first branched conveyance path K4, and a sheet wound around the winding roller 20.

In the third conveyance path K3, the first guide 25 restricts the two-ply sheet PJ from bending upward, in particular, restricts the first sheet P1 from bending upward, between the winding roller 20 and the third conveyance roller pair 6. Accordingly, the gap C of the two-ply sheet PJ, which is specifically formed when the first sheet P1 is bent upward, is intensively formed between the first guide 25 and the third conveyance roller pair 6. Accordingly, the above-described configuration can increase the size of the gap C even if the winding amount of the two-ply sheet PJ wound around the winding roller 20 is not large. Thus, the separation claws 16 can smoothly enter the gap C to reliably separate the two-ply sheet PJ.

A description is now given of a second guide 26 according to the present embodiment, with reference to, for example, FIGS. 8A, 8B, and 8C. The second guide 26 is disposed between the separation claws 16 and the winding roller 20 on the third conveyance path K3 and functions as a guide to guide the second sheet P2 that is an outer sheet of the first sheet P1 and the second sheet P2 of the two-ply sheet PJ wound around the winding roller 20.

Specifically, the second guide 26 as the guide is a conveyance guide disposed below the imaginary plane S1 (see FIG. 8A) on a side of the third conveyance path K3 on which the winding roller 20 is not disposed with respect to the imaginary plane S1. The second guide 26 is disposed to face the lower surface of the sheet between a position near and upstream from the second conveyance roller pair 5 and a position near and downstream from the third conveyance roller pair 6 in the sheet conveyance direction. In other words, the sheet conveyed in the third conveyance path K3 is guided by the second guide 26.

Specifically, in the third conveyance path K3 between the winding roller 20 and the third conveyance roller pair 6, a clearance between the first guide 25 and the second guide 26 is set to be a value in which the sheet having a largest thickness can be conveyed. Accordingly, a gap between the first sheet P1 and the second sheet P2 of the two-ply sheet PJ is restricted to be not too large between the first guide 25 and the second guide 26. As a result, the gap C of the two-ply sheet PJ that is formed in particular when the first sheet P1 is bent upward, is intensively formed between the first guide 25 and the third conveyance roller pair 6. Accordingly, the separation claws 16 can be smoothly inserted into the gap C to separate the two-ply sheet PJ.

A description is now given of the sixth sensor 46, with reference to, for example, FIG. 8A. The sixth sensor 46 functions as an abnormality sensor to detect an abnormal condition in which the gap C formed between the first sheet P1 and the second sheet P2 at a predetermined position, i.e., a position between the third conveyance roller pair 6 and the winding roller 20, is not larger than a predetermined size before the separation claws 16 move from the standby positions, to be more specific, before the separation claws 16 move from the standby positions illustrated in FIG. 16 to the positions to separate the first sheet P1 and the second sheet P2, as illustrated in FIGS. 11 and 12A. In other words, the sixth sensor 46 as the abnormality sensor detects the abnormal condition in which the gap C formed between the first sheet P1 and the second sheet P2 at the predetermined position is not larger than the predetermined size before the separation claws 16 are inserted into the gap C.

Still in other words, the sixth sensor 46 as the abnormality sensor detects a condition in which the gap C is not formed at all or a condition in which the gap C having a sufficient gap size is not formed at a timing at which the gap C is to be formed between the first sheet P1 and the second sheet P2 as illustrated in FIGS. 7D and 8A as an abnormal condition.

In the present embodiment, the controller 350 notifies the occurrence of an abnormality when the abnormality is detected by the sixth sensor 46. Specifically, as illustrated in FIG. 1, the image forming system 300 includes the operation display panel 49 that functions as an operation display panel on the exterior of the image forming apparatus 100 of the image forming system 300 to display various kinds of information about the image forming system 300 and input various kinds of commands. When the sixth sensor 46 detects that the two-ply sheet PJ does not have the sufficiently large gap C, the controller 350 causes the operation display panel 49 to display that an abnormality is detected. For example, the operation display panel 49 displays "An abnormality has occurred. The processing of inserting the inner sheet is stopped. Please check the setting direction of the two-ply sheet in the unit feed tray. If the setting direction is correct and similar abnormalities are repeated, please contact a service representative".

The above-described sixth sensor 46 as the abnormality sensor may be a lever-type sensor that contacts the upper first sheet P1 of the two-ply sheet PJ forming the gap C larger than the predetermined size or other type sensors.

A description is now given of an operation of the sheet laminator 50 in which the two-ply sheet PJ is separated, with reference to FIGS. 6A, 6B, 6C, 6D, 7A, 7B, 7C, 7D, 8A, 8B, 8C, 9A, 9B, 9C, 10A, 10B, and 10C.

In the description of the operation of the sheet laminator 50, the operation of the separation claws 16 is described as needed with reference to FIGS. 11, 12A, 12B, 12C, 12D, and 12E. At the same time, the control procedure of the sheet laminator 50 is described with reference to flowcharts of FIGS. 14, 15A, and 15B.

Figure 14:
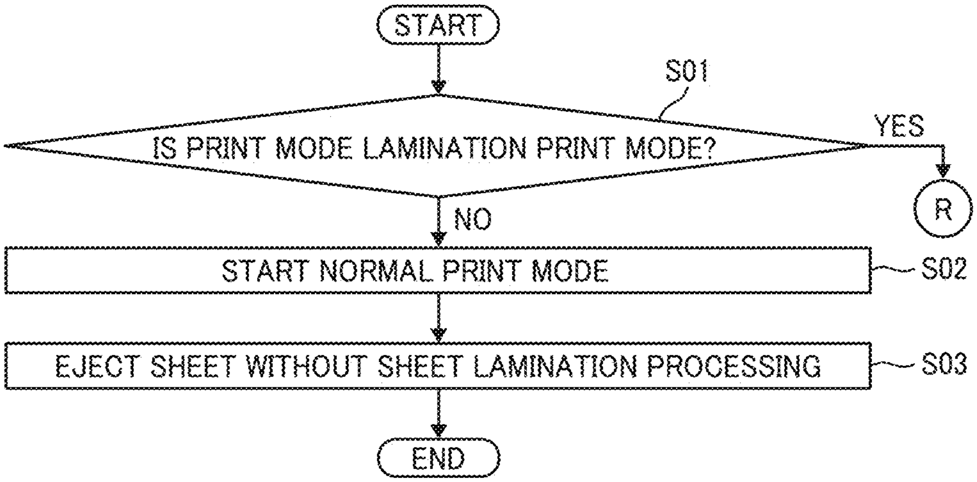
FIG. 14 is a flowchart of a control procedure performed by the image forming system of FIG. 1, according to an embodiment of the present disclosure.

First, when the print operation command is issued, the controller 350 determines whether the print mode is the lamination mode, i.e., the lamination print mode (step S01 of FIG. 14). When it is determined that the print mode is not the lamination print mode, it is determined that the print mode is the normal print mode. As such, the normal print mode is started (step S02). Then, the print operation is performed on a sheet P that is fed from the body feed tray 112. After the print operation is completed, the lamination processing is not performed on the sheet P and the sheet P on which an image has been formed is ejected to the second output tray 14 (step S03 of FIG. 14). After completion of step S03, the procedure of the normal print mode is completed.

Figure 15A:
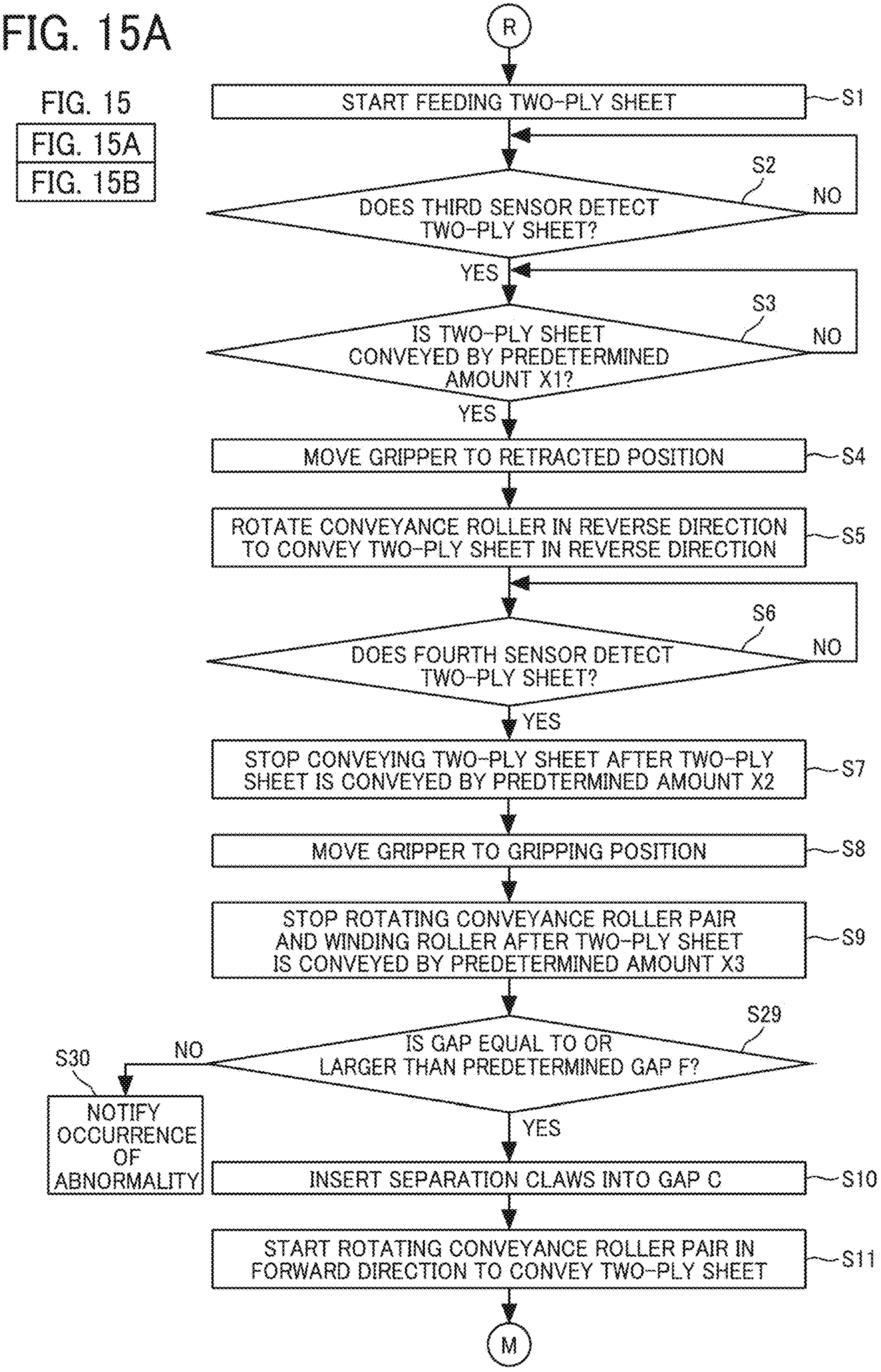
FIG. 15 is a flowchart of a control procedure subsequent to the control procedure of FIG. 14, illustrating a control procedure when a lamination mode is performed, according to an embodiment of the present disclosure.
Figure 15B:
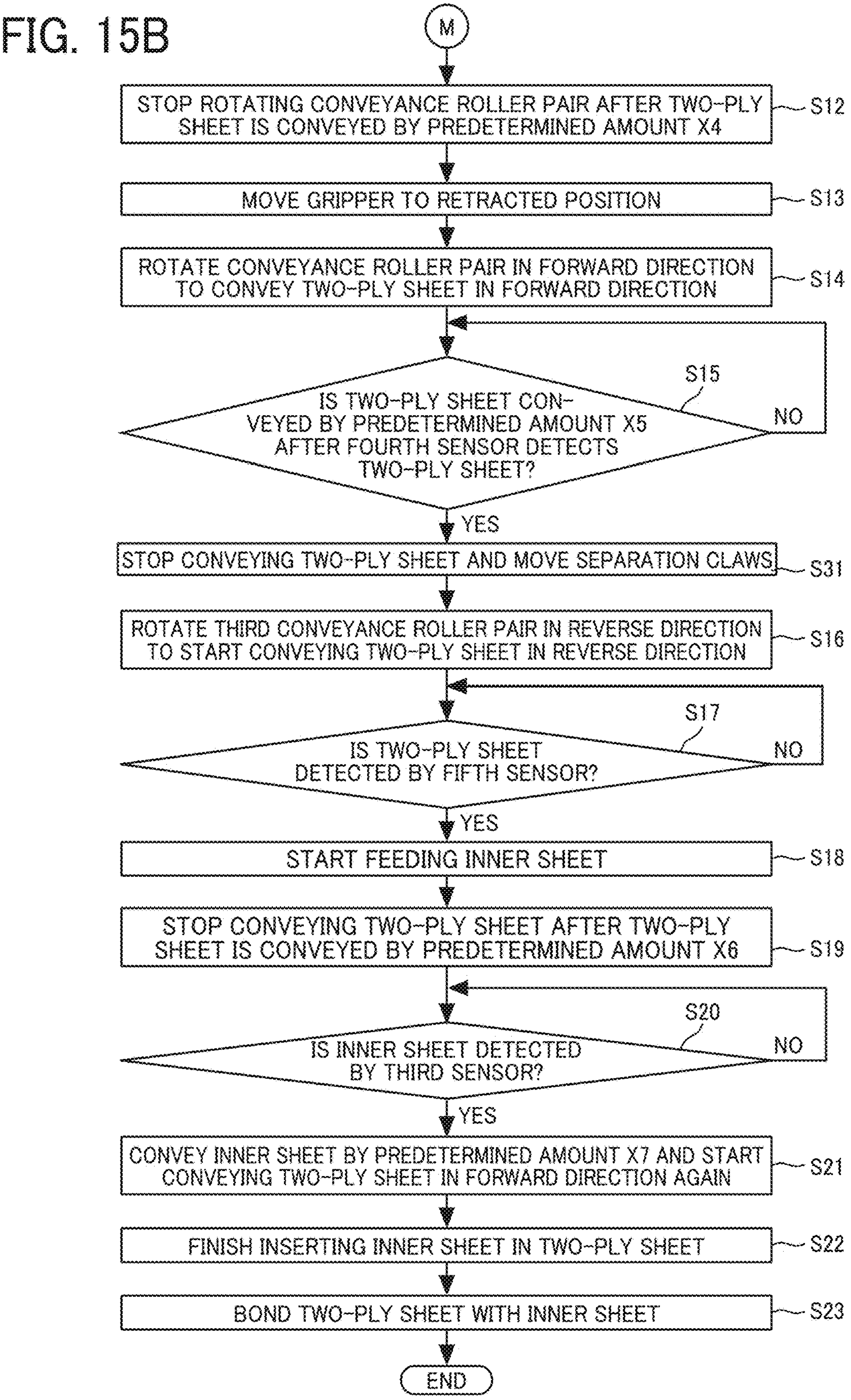

Alternatively, when it is determined that the lamination mode, i.e., the lamination print mode is selected as the print mode (YES in step S01 in FIG. 14), the control procedure of the flowchart in FIGS. 15A and 15B is performed.

First, the sheet feed roller 2 and the first conveyance roller pair 4 start feeding a two-ply sheet PJ from the unit feed tray 11 (step S1 of FIG. 15A). Then, as illustrated in FIG. 6A, the second conveyance roller pair 5 conveys the two-ply sheet PJ with the bonding portion A as the leading end of the two-ply sheet PJ in the forward direction, which is a direction from the right side to the left side in FIGS. 6A, 6B, 6C, and 6D in the third conveyance path K3.

At this time, the controller 350 causes the moving mechanism 30 to position the gripper 32 at the gripping position. In other words, the cam 34 rotates to move to a rotational position at which the cam 34 does not press the arm 31. When the gripper 32 is positioned at the gripping position as described above, the gripper 32 does not interfere with the conveyance of the two-ply sheet PJ on the third conveyance path K3. The separation claws 16 stand by at the standby positions, i.e., the positions illustrated in FIG. 12A, at which the separation claws 16 does not interfere with the conveyance of the two-ply sheet PJ on the third sheet conveyance path K3.

Subsequently, the controller 350 determines whether the third sensor 43 detects the bonding portion A of the two-ply sheet PJ, which is the leading end of the two-ply sheet PJ conveyed in the forward direction (step S2 of FIG. 15A). The controller 350 uses a timing at which the third sensor 43 detects the bonding portion A as a trigger and, as illustrated in FIG. 6B, the controller 350 causes the third conveyance roller pair 6 to convey the two-ply sheet PJ in the forward direction by a predetermined amount X1 until the gripped portion B of the two-ply sheet PJ, which is the trailing end of the two-ply sheet PJ in the forward direction, passes through the position of the winding roller 20 (step S3 of FIG. 15A).

As illustrated in FIG. 6C, the controller 350 causes the third conveyance roller pair 6 to temporarily stop the conveyance of the two-ply sheet PJ conveyed by the predetermined amount X1 and causes the gripper 32 to move from the gripping position to the retracted position (step S4 of FIG. 15A). In other words, the controller 350 causes the cam 34 to move to a rotational position at which the cam 34 presses the arm 31. While the cam 34 presses the arm 31, the gripped portion B of the two-ply sheet PJ can be received between the gripper 32 and the receiving portion 20*b* of the winding roller 20.

Then, as illustrated in FIG. 6D, the controller 350 causes the third conveyance roller pair 6 to rotate in the reverse direction to start the conveyance of the two-ply sheet PJ in the reverse direction (step S5 of FIG. 15A). At this time, the fourth sensor 44 detects the gripped portion B of the two-ply sheet PJ, which is the leading end of the two-ply sheet PJ conveyed in the reverse direction.

Subsequently, as illustrated in FIG. 5A, the controller 350 uses the timing at which the fourth sensor 44 detects the gripped portion B of the two-ply sheet PJ as a trigger (step S6 of FIG. 11A) and stops the conveyance of the two-ply sheet PJ (step S7 of FIG. 11A) at a timing at which the third conveyance roller pair 6 conveys the two-ply sheet PJ by a predetermined amount X2, which is a timing at which the gripped portion B of the two-ply sheet PJ reaches the position of the winding roller 20, i.e., the winding start position W.

Then, as illustrated in FIG. 7B, the gripper 32 is moved from the retracted position to the gripping position while the gripped portion B of the two-ply sheet PJ is at the winding start position W (step S8 of FIG. 15A). In other words, the controller 350 causes the cam 34 to move to a rotational position at which the cam 34 does not press the arm 31. While the cam 34 is positioned at the rotational position, as illustrated in FIG. 7B', the end faces of the other end of the two-ply sheet PJ do not contact any component, and the gripped portion B of the two-ply sheet PJ is gripped between the gripper 32 and the receiving portion 20*b*.

As illustrated in FIG. 7C, the winding roller 20 rotates in the reverse direction, i.e., the counterclockwise direction, while the gripper 32 grips the two-ply sheet PJ. At the same time, the third conveyance roller pair 6 again rotates in reverse together with the winding roller 20. At this time, as the winding roller 20 rotates, the gap C is formed between the first sheet P1 and the second sheet P2 of the two-ply sheet PJ between the winding roller 20 and the third conveyance roller pair 6, as illustrated in FIG. 7D. When the gap C is formed, the first guide 25 and the second guide 26 restrict the bending of the two-ply sheet PJ in the vicinity of the winding roller 20. Accordingly, the gap C of the two-ply sheet PJ is intensively formed near the third conveyance roller pair 6.

As described above, the fourth sensor 44 is disposed downstream from the third conveyance roller pair 6 in the reverse direction and the controller 350 causes the fourth sensor 44 to detect the leading end of the two-ply sheet PJ conveyed in the reverse direction. In response to the detection of the leading end of the two-ply sheet PJ by the fourth sensor 44, the controller 350 determines the timing at which the gripper 32 grips the two-ply sheet PJ. Due to such a configuration, the gripped portion B of the two-ply sheet PJ can be accurately conveyed to a desired gripping position regardless of variations in the sheet lengths, which may vary even in sheets having the same size as sold, with respect to the required sheet conveyance amount X2.

The fourth sensor 44 detects the leading end of the two-ply sheet PJ conveyed in the reverse direction. Accordingly, the sheet conveyance amount X2 can be shortened regardless of the sheet length. Such a configuration as described above can reduce variation in the conveyance amount X2 and allows the gripped portion B of the two-ply sheet PJ to be conveyed accurately to the desired gripping position.

For this reason, the fourth sensor 44 is preferably disposed near the winding roller 20.

With reference to FIG. 7C', the above description was given of a mechanism in which the two-ply sheet PJ is wound around the winding roller 20 to form the gap C inside the two-ply sheet PJ between the winding roller 20 and the third conveyance roller pair 6.

The detailed description is additionally given of the above-described mechanism as follows.

The two-ply sheet PJ wound around the winding roller 20 is gripped by the gripper 32. Accordingly, the two-ply sheet PJ is restricted from being slipped. Due to this configuration, a slip is generated between the first sheet P1 and the second sheet P2 by the amount of difference in the circumferential length of the winding roller 20. For this reason, the conveyance amount of the first sheet P1 as the inner sheet of the two-ply sheet PJ is smaller than the conveyance amount of the second sheet P2 as the outer sheet of the two-ply sheet PJ. As a result, slack, i.e., bending is formed in the first sheet P1 as the inner sheet of the two-ply sheet PJ between the nip of the third conveyance roller pair 6 and the winding roller 20. At this time, the two-ply sheet PJ is wound around the winding roller 20 by one or more rounds. By so doing, the difference in the circumferential length of the winding roller 20 is generated between the inner circumference and the outer circumference of the winding roller 20 by the thickness of the sheet. As a result, the slack in the first sheet P1 is additionally formed.

More specifically, when the thickness of the first sheet P1 as the inner sheet is ΔR and the distance between the rotary shaft 20*a*, i.e., the axial center of the winding roller 20 and the first sheet P1 is R, the distance from the rotary shaft 20*a* of the winding roller 20 to the second sheet P2 as the outer sheet is R+ΔR. The radius of the first sheet P1 as the inner sheet of the two-ply sheet PJ wound around the winding roller 20 and the radius of the second sheet P2 as the outer sheet wound around the first sheet P1 is different by the thickness of the first sheet P1 ΔR. Accordingly, when the two-ply sheet PJ is wound around the winding roller 20 by one round, a circumferential length difference of $2\times\Delta R\times\pi$ is generated between the first sheet P1 as the inner sheet and the second sheet P2 as the outer sheet. As a result, when the number of winding the two-ply sheet PJ around the winding roller 20 is M times, the slack of the first sheet P1 as the inner sheet is generated by the circumferential length difference of 2×ΔR×π×M.

Finally, the slack is accumulated between the third conveyance roller pair 6 and the winding roller 20, and the gap C corresponding to 2×ΔR×π×M is formed between the first sheet P1 and the second sheet P2.

Subsequently, as illustrated in FIG. 8A, after the winding roller 20 starts the winding of the two-ply sheet PJ, the third conveyance roller pair 6 stops the conveyance of the two-ply sheet PJ at the timing at which the third conveyance roller pair 6 conveys the two-ply sheet PJ by a predetermined amount X3. At the same time, the winding roller 20 stops winding the two-ply sheet PJ (step S9 of FIG. 15A). When the conveyance and winding of the two-ply sheet PJ are stopped as described above, the two-ply sheet PJ is wound around the winding roller 20 one or more times. The gap C of the two-ply sheet PJ, i.e., the distance between the first sheet P1 and the second sheet P2 in the vertical direction, is sufficiently widened if the two-ply sheet PJ is appropriately separated.

At this time, the controller 350 determines whether the sixth sensor 46 detects the gap C equal to or larger than a predetermined gap F is formed in the two-ply sheet PJ (step S29 of FIG. 15A).

As a result, when the controller 350 determines that the gap C is sufficiently large to be equal to or larger than the predetermined distance F, the controller 350 determines that the subsequent sheet separating operations of the separation claws 16 do not cause a problem. Accordingly, the separation claws 16 are inserted into the gap C sufficiently widened in the two-ply sheet PJ, as illustrated in FIG. 8B (step S10 of FIG. 15A). In other words, as illustrated in FIGS. 11 and 12A, each of the separation claws 16 in pair is moved from the standby position to the separation position.

Then, as illustrated in FIG. 8C, the third conveyance roller pair 6 and the winding roller 20 start rotating in the forward direction, in other words, in the clockwise direction, while the separation claws 16 are inserted into the gap C (step S11 of FIG. 15A). In other words, as illustrated in FIGS. 12A, 12B, and 12C, the separation claws 16 that are inserted into the gap C of the two-ply sheet PJ relatively move from the one end of the two-ply sheet PJ, i.e., the bonding portion A, to the other end of the two-ply sheet PJ, i.e., the gripped portion B. The above-described relative movement of the separation claws 16 in the present embodiment is achieved by moving the two-ply sheet PJ itself in a direction indicated by arrows in FIGS. 12A, 12B, and 12C, without changing the positions of the separation claws 16 in the sheet conveyance direction.

As illustrated in FIG. 9A, the controller 350 stops the forward rotation of the third conveyance roller pair 6 and forward rotation of the winding roller 20 after the forward rotation in the third conveyance roller pair 6 conveys the two-ply sheet PJ by a predetermined amount X4 (step S12 of FIG. 15B). At this time, the gripped portion B of the two-ply sheet PJ is positioned at the winding start position W illustrated in FIG. 7B on the third conveyance path K3, at which the gripper 32 may release the gripped portion B. In addition, as illustrated in FIG. 12C, the separation claws 16 stop near the other end of the two-ply sheet PJ after the separation claws 16 are inserted into the gap C of the two-ply sheet PJ and relatively move to the other end, i.e., the gripped portion B, of the two-ply sheet PJ.

While the separation claws 16 stop near the other end of the two-ply sheet PJ, the gripper 32 moves from the gripping position to the retracted position (step S13 of FIG. 15B). In other words, the controller 350 causes the cam 34 to move to the rotational position at which the cam 34 does not press the arm 31. By so doing, the gripper 32 releases the gripping of the two-ply sheet PJ. In the present embodiment, the cam 34 of the moving mechanism 30 moves to release the gripping of the gripper 32. However, the third conveyance roller pair 6 may pull the two-ply sheet PJ from the gripper 32 to release the gripping and convey the two-ply sheet PJ without the above-described movement of the cam 34 of the moving mechanism 30, when a pulling force due to the conveyance of the third conveyance roller pair 6 is larger than a force of the gripper 32 that grips the two-ply sheet PJ.

Then, as illustrated in FIG. 9B, the controller 350 causes the third conveyance roller pair 6 to rotate in the forward direction again to start the conveyance of the two-ply sheet PJ in the forward direction (step S14 of FIG. 15B). In addition, after the gripped portion B of the two-ply sheet PJ, i.e., the other end of the two-ply sheet PJ and the trailing end of the two-ply sheet PJ in the forward direction, passes over a branching point between the third conveyance path K3 and either the first branched conveyance path K4 or the second branched conveyance path K5, the controller 350 causes the gripper 32 to move from the retracted position to the gripping position. Further, at this time, the fourth sensor 44 detects the gripped portion B of the two-ply sheet PJ, i.e., the other end of the two-ply sheet PJ and the trailing end of the two-ply sheet PJ in the forward direction. Then, the controller 350 determines whether the third conveyance roller pair 6 conveys the two-ply sheet PJ by a predetermined amount X5 in response to the timing at which the fourth sensor 44 detects the trailing end of the two-ply sheet PJ conveyed in the forward direction (step S15 of FIG. 15B). When the third conveyance roller pair 6 does not convey the two-ply sheet PJ by the predetermined amount X5 after the fourth sensor 44 has detected the gripped portion B of the two-ply sheet PJ (NO in step S15 of FIG. 15B), step S15 is repeated until the third conveyance roller pair 6 conveys the two-ply sheet PJ by the predetermined amount X5 after the fourth sensor 44 has detected the gripped portion B of the two-ply sheet PJ. By contrast, when the third conveyance roller pair 6 conveys the two-ply sheet PJ by the predetermined amount X5 after the fourth sensor 44 has detected the gripped portion B of the two-ply sheet PJ (YES in step S15 of FIG. 15B), as illustrated in FIG. 12D, the controller 350 causes the third conveyance roller pair 6 to stop the conveyance of the two-ply sheet PJ and causes the separation claws 16 to move in the width direction of the two-ply sheet PJ from the standby positions to the separation positions (step S31 of FIG. 15B). Accordingly, as illustrated in FIG. 9B, the trailing ends of the first sheet P1 and the second sheet P2 of the two-ply sheet PJ conveyed in the forward direction are separated and largely opened (see FIG. 12D). At this time, the controller 350 starts to perform the sheet separating operation on the two-ply sheet PJ.

Subsequently, as illustrated in FIG. 9C, the third conveyance roller pair 6 rotates in reverse to start the conveyance of the two-ply sheet PJ in the reverse direction (step S16 of FIG. 15B). At this time, the separation claws 16 are disposed at the switching positions, i.e., the positions illustrated in FIG. 12D, at which the separation claws 16 block the two-ply sheet PJ from moving to the third conveyance path K3. Accordingly, the first sheet P1 and the second sheet P2 separated from each other are guided to the first branched conveyance path K4 and the second branched conveyance path K5, respectively, as illustrated in FIG. 9C. At this time, the fifth sensor 45 (see FIG. 2) detects the bonding portion A of the two-ply sheet PJ, which is the one end of the two-ply sheet PJ and the trailing end of the two-ply sheet PJ conveyed in the reverse direction. Subsequently, the controller 350 determines whether the fifth sensor 45 (see FIG. 2) that functions as a sheet detector has detected the trailing end, i.e., the bonding portion A, of the two-ply sheet PJ conveyed in the reverse direction (step S17 of FIG. 15B). In response to the timing of detection of the trailing end of the two-ply sheet PJ in the reverse direction by the fifth sensor 45, the controller 350 causes the feed roller 197 to feed the inner sheet PM from the body feed tray 112 (step S18 of FIG. 15B).

The timing at which the feed roller 197 starts to feed the inner sheet PM is not limited to the above-described timing. However, it is preferable to set the timing to reduce the time to be taken for the sheet lamination mode depending on the time required for printing an image on the inner sheet PM in the image forming apparatus 100.

Subsequently, the controller 350 uses, as a trigger, the timing at which the fifth sensor 45 (see FIG. 2) detects the trailing end, i.e., the bonding portion A, of the two-ply sheet PJ conveyed in the reverse direction (step S17 of FIG. 11B) and stops the conveyance of the two-ply sheet PJ at a timing at which the third conveyance roller pair 6 conveys the two-ply sheet PJ by a predetermined amount X6 as illustrated in FIG. 8A (step S19 of FIG. 11B). When the third conveyance roller pair 6 conveys the two-ply sheet PJ by the predetermined amount X6, the bonding portion A of the two-ply sheet PJ is disposed at the nip of the third conveyance roller pair 6 or at a position slightly leftward from the nip. In other words, the third conveyance roller pair 6 nips the one end, i.e., the bonding portion A, of the two-ply sheet PJ. With the one end, i.e., the bonding portion A, of the two-ply sheet PJ nipped by the third conveyance roller pair 6, the sheet separating operation of the two-ply sheet PJ is completed.

Figure 10A:
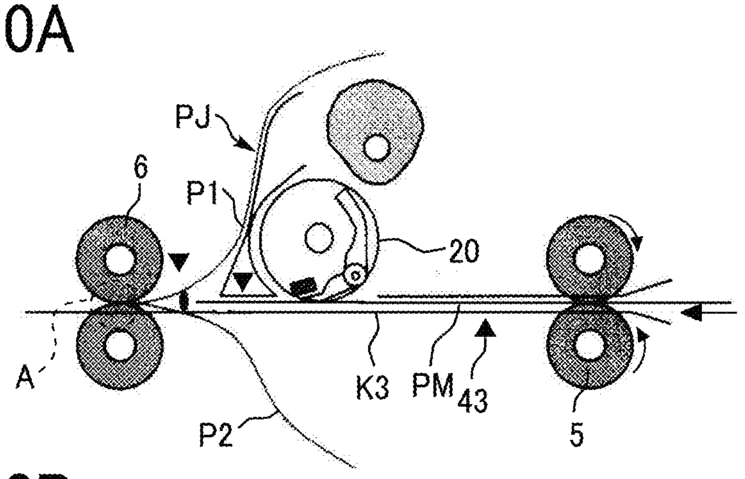
FIGS. 10A, 10B, and 10C are diagrams each illustrating an operation of the sheet separator of FIGS. 6A, 6B, 6C, and 6D, followed by the operation illustrated in FIGS. 9A, 9B, and 9C.

Before completion of the sheet separating operation of the two-ply sheet PJ, the inner sheet PM has already been fed from the body feed tray 112 and the print operation on the inner sheet PM has substantially been completed. For this reason, as illustrated in FIG. 10A, when the sheet separating operation of the two-ply sheet PJ is completed, the leading end of the inner sheet PM, i.e., the one end of the inner sheet PM in the forward direction, has approached the position at which the inner sheet PM is inserted between the first sheet P1 and the second sheet P2 of the two-ply sheet PJ.

Figure 10B:
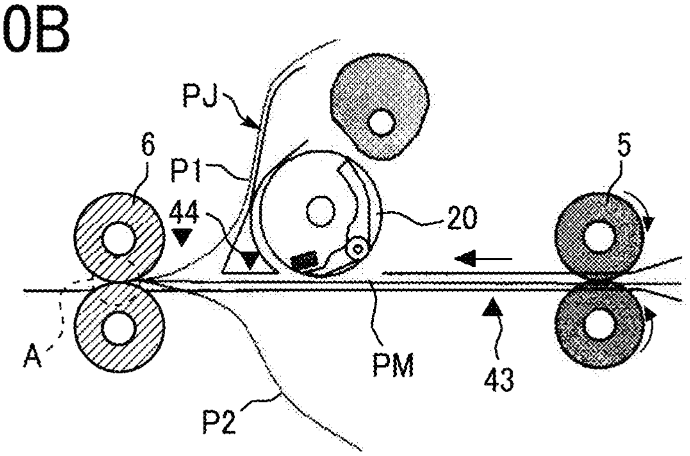

By contrast, the third sensor 43 detects the leading end of the inner sheet PM conveyed in the forward direction. In addition, as illustrated in FIG. 10B, in response to the detection of the leading end of the inner sheet PM, the separation claws 16 move to the respective standby positions at the timing at which the separation claws 16 do not block the conveyance of the inner sheet PM.

Figure 10C:
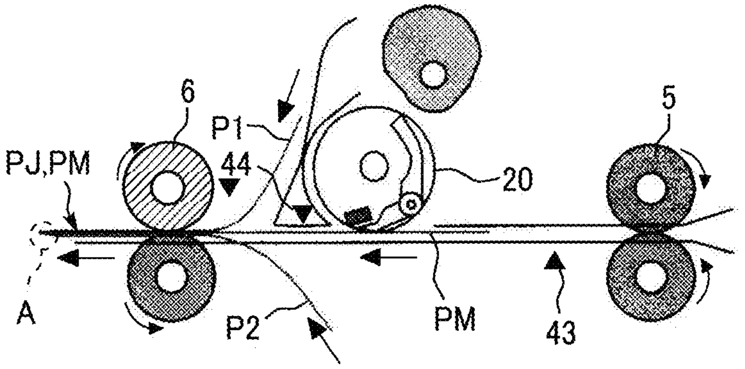
Figure 12E:
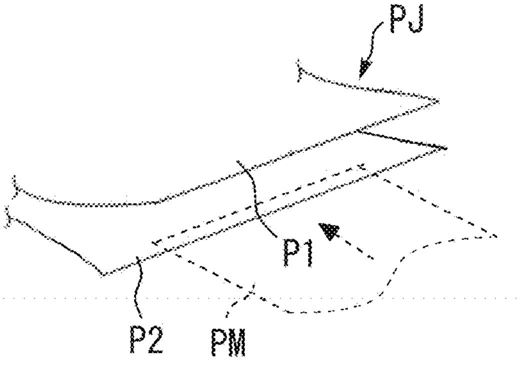

Subsequently, as illustrated in FIGS. 10C and 12E, the controller 350 determines whether the third sensor 43 has detected the leading end of the inner sheet PM in the forward direction (step S20 of FIG. 15B). When the third sensor 43 has not detected the leading end of the inner sheet PM in the forward direction (NO in step S20 of FIG. 15B), step S20 is repeated until the third sensor 43 detects the leading end of the inner sheet PM in the forward direction. By contrast, when the third sensor 43 has detected the leading end of the inner sheet PM in the forward direction (YES in step S20 of FIG. 15B), in response to the detection of the leading end of the inner sheet PM, the controller 350 causes the second conveyance roller pair 5 to convey the inner sheet PM by a predetermined amount X7. Then, the controller 350 causes the third conveyance roller pair 6 to start conveying the two-ply sheet PJ in the forward direction again (step S21 of FIG. 15B). At this time, the inner sheet PM is accurately nipped at a desired position between the first sheet P1 and the second sheet P2 of the two-ply sheet PJ.

Thus, the controller 350 finishes the sheet inserting operation to insert the inner sheet PM into the two-ply sheet PJ, in other words, between the first sheet P1 and the second sheet P2 of the two-ply sheet PJ (step S22 of FIG. 15B).

Subsequently, the controller 350 causes the third conveyance roller pair 6 to convey the two-ply sheet PJ, in which the inner sheet PM has been inserted after the sheet separating operation, to pass through the fourth conveyance path K6, and then to be conveyed to the sheet lamination device 51. After the two-ply sheet PJ passes through the sheet lamination device 51, the entire region of the two-ply sheet PJ is bonded with the inner sheet PM inserted inside the two-ply sheet PJ (step S23 of FIG. 15B). Then, the two-ply sheet PJ on which the sheet laminating operation has been performed as described above is ejected to the outside of the sheet lamination device 51 by the first ejection roller pair 7 to be stacked on the first output tray 13.

As described above, the sheet laminator 50 according to the present embodiment performs the sheet laminating operation as a sequence of the following operations: an operation to feed the two-ply sheet PJ; an operation to separate the first sheet P1 and the second sheet P2 of the two-ply sheet PJ; an operation to insert the inner sheet PM between the first sheet P1 and the second sheet P2; and an operation to perform the lamination processing on the two-ply sheet PJ in which the inner sheet PM is inserted. The sequence of these operations can enhance the user convenience for the sheet laminator 50.

By contrast, when the controller 350 determines that the gap C of the two-ply sheet PJ is not a sufficiently large gap equal to or greater than the predetermined distance F (NO in step S29 of FIG. 15A), in other words, when the controller 350 determines that the abnormality occurs based on the results detected by the sixth sensor 46, the controller 350 determines that the subsequent sheet separating operations of the separation claws 16 cause various kinds of problems. Accordingly, the controller 350 does not cause the separation claws 16 to move from the standby positions to the separation positions. At this time, the controller 350 causes the operation display panel 49 (see FIG. 2) to notify that the sheet separating operation of the two-ply sheet PJ and the sheet inserting operation of the inner sheet PM are stopped due to the occurrence of the abnormality (step S30 of FIG. 15A).

When such an abnormality occurs, the sheet P that is involved in the abnormality is conveyed toward the third output tray 55 by the third conveyance roller pair 6 and stacked.

A detailed description is now given below of the control of the image forming system 300 according to embodiments of the present disclosure.

As described above with reference to, for example, FIG. 1, the image forming system 300 according to embodiments of the present disclosure includes the image forming apparatus 100 and the sheet laminator 50 and performs the normal print mode and the lamination print mode.

The normal print mode is a print mode in which a sheet P printed and conveyed by the image forming apparatus 100 is ejected without being subjected to the lamination processing. More specifically, the sheet laminator 50 includes the bypass ejection path K7 as a sheet ejection path through which the sheet P conveyed from the image forming apparatus 100 is ejected without passing through the sheet separator 1 and the sheet lamination device 51 when the normal print mode is performed.

Alternatively, the lamination print mode is a print mode in which a sheet P, i.e., an inner sheet PM, printed and conveyed by the image forming apparatus 100 is subjected to the lamination processing by the sheet laminator 50 and is ejected.

In the present embodiment, the image forming apparatus 100 and the sheet laminator 50 are connected to a single-system power supply, i.e., a single-system power supply circuit, having a predetermined rating capacity, i.e., an upper-limit wattage, of power consumption.

A description is now given of a control mode in the following description with reference to FIGS. 17 and 18. In the present embodiment, when the lamination print mode is started, the control mode, which may also be referred to simply as a "start-up shift mode" where appropriate, is performed. In the control mode, a first start-up period t1 and a second start-up period t2 are controlled such that the first start-up period t1 and the second start-up period t2 do not overlap. The first start-up period t1 is a period from when the power starts to be supplied to the image forming apparatus 100 until the supplied power, i.e., the power consumption of the image forming apparatus 100, reaches a peak, which is about 1200 watts in the example of FIG. 18, and is stabilized. The second start-up period t2 is a period from when the power starts to be supplied to the sheet laminator 50 until the supplied power, i.e., the power consumption of the sheet laminator 50, reaches a peak, which is about 1200 watts in the example of FIG. 18.

Figure 22:
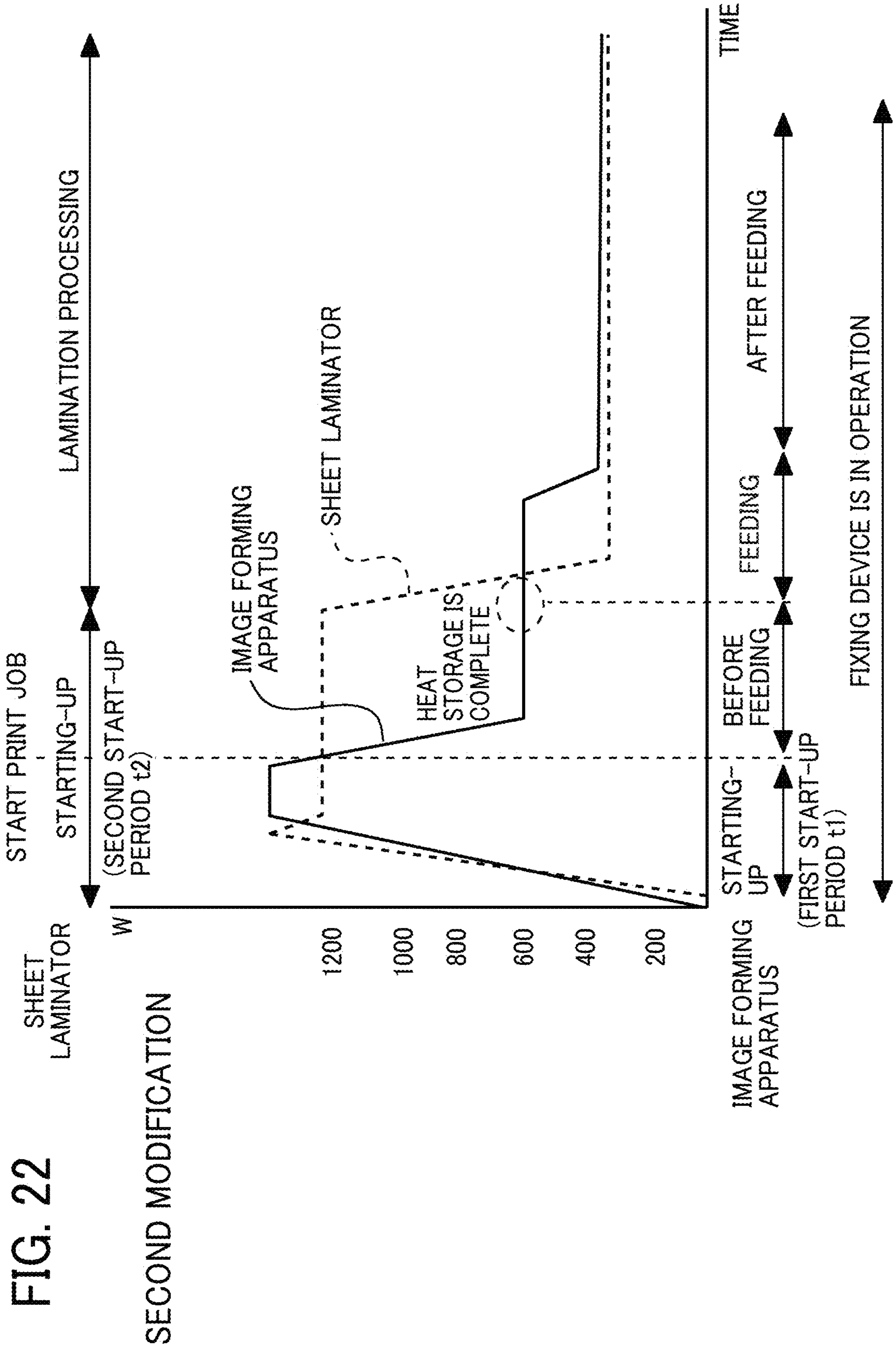
FIG. 22 is a graph illustrating a transition of power consumption when the lamination print mode is performed in the control procedure of FIG. 21.

In other words, in the start-up shift mode, i.e., the control mode, the start-up of the image forming apparatus 100 and the start-up of the sheet laminator 50 are not performed substantially concurrently as in the example of FIG. 22. Such an operational mode in which the start-up of the image forming apparatus 100 and the start-up of the sheet laminator 50 are performed substantially concurrently may also be referred to simply as a normal start-up mode in the following description. However, the timing at which the start-up of the image forming apparatus 100 is performed and the timing at which the start-up of the sheet laminator 50 is performed are shifted from each other.

More specifically, in the present embodiment, the controller 350 controls such that the first start-up period t1 is performed after the second start-up period t2 is performed. In other words, the controller 350 controls such that the start-up of the image forming apparatus 100 is performed after the start-up of the sheet laminator 50.

In embodiments of the present disclosure, the start-up of the image forming apparatus 100 or the start-up of the sheet laminator 50 is a period that shifts from a condition in which the printing operation of the image forming apparatus 100 or the lamination processing operation including the sheet separating processing and the sheet insertion processing of the sheet laminator 50 cannot be performed to a condition in which the printing operation of the image forming apparatus 100 or the lamination processing operation including the sheet separating processing and the sheet insertion processing of the sheet laminator 50 can be performed.

In particular, the above-described start-up of the image forming apparatus 100 or the start-up of the sheet laminator 50 means a condition in which the fixing temperature of the fixing device 120 of the image forming apparatus 100 or the fixing temperature of the sheet lamination device 51 of the sheet laminator 50 reaches a predetermined temperature stably.

More specifically, as described above with reference to FIG. 5, the image forming system 300 according to the present embodiment includes the power consumption calculation unit 373 that calculates power, i.e., power consumption, consumed by the image forming apparatus 100 during the first start-up period t1 and power, i.e., the power consumption, consumed by the sheet laminator 50 during the second start-up period t2.

The start-up shift mode, i.e., the control mode, is performed when the calculation result of the power consumption calculation unit 373 does not exceed a predetermined upper-limit value such that the power consumption consumed by the image forming apparatus 100 or the power consumption consumed by the sheet laminator 50 does not exceed the upper-limit value.

Figure 18:
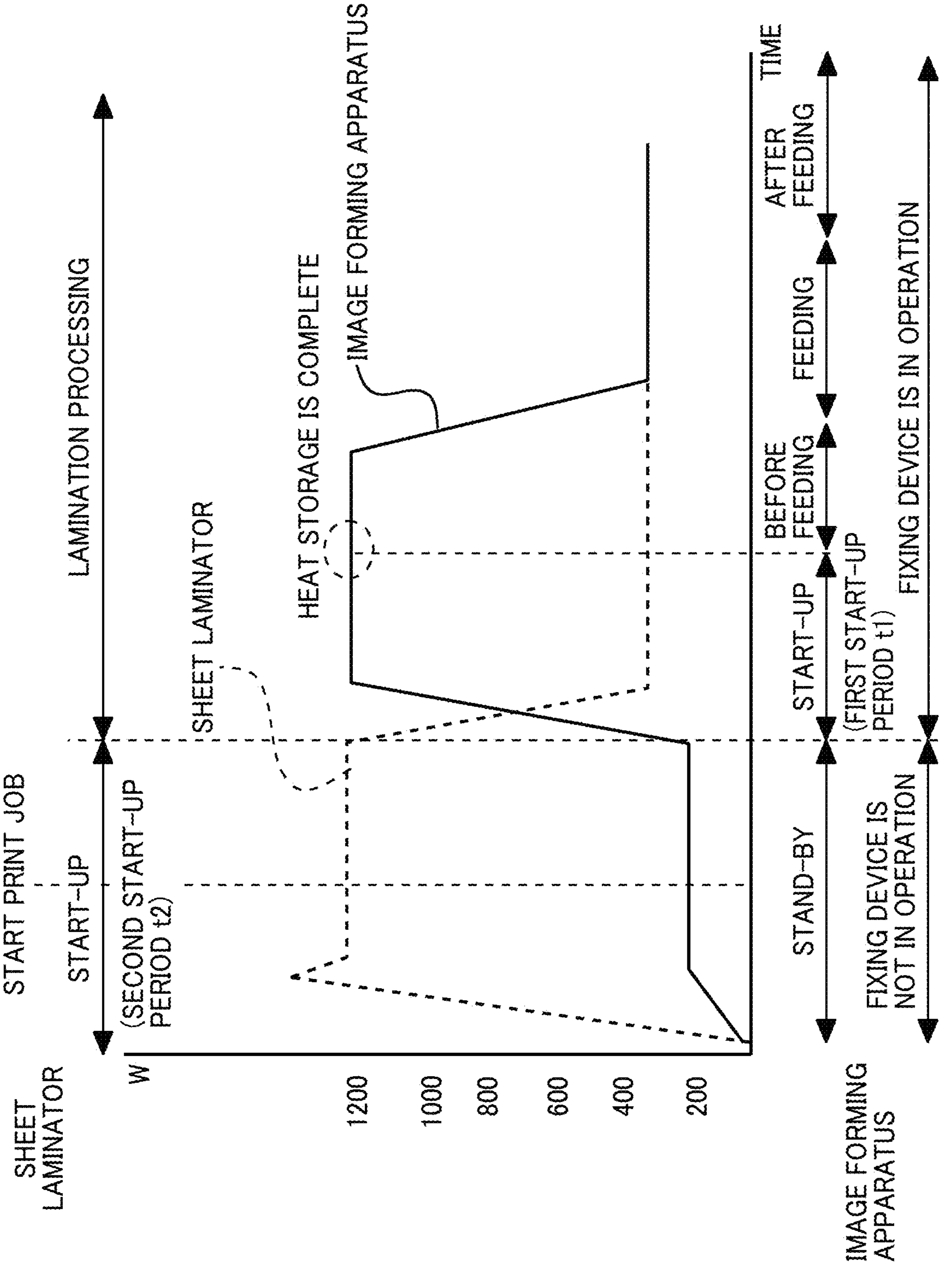
FIG. 18 is a graph illustrating a transition of power consumption when the lamination print mode is performed, according to an embodiment of the present disclosure.

More specifically, the power consumption calculation unit 373 monitors the transition of the power consumption of the image forming apparatus 100 in the first start-up period t1 and the transition of the power consumption of the sheet laminator 50 in the second start-up period t2, as illustrated in FIG. 18, and adds up the power consumption consumed by the image forming apparatus 100 and the sheet laminator 50 during each of the first start-up period t1 and the second start-up period t2. The first start-up period t1 in which the image forming apparatus 100 starts up is shifted with respect to the second start-up period t2 in which the sheet laminator 50 starts up such that the sum value of the power consumption of the image forming apparatus 100 and the sheet laminator 50 during each of the first start-up period t1 and the second start-up period t2 may not exceed a predetermined upper-limit value, which is 1500 watts in the present embodiment.

In other words, the first start-up period t1 and the second start-up period t2 are determined such that there is no moment when the sum of the power consumption of the image forming apparatus 100 during the first start-up period t1 and the power consumption of the sheet laminator 50 in the second start-up period t2, which are the total power consumption of the image forming system 300, exceeds the predetermined upper-limit value.

As described above, in the present embodiment, in the lamination print mode, the start-up shift mode, i.e., the control mode, can be performed such that the first start-up period t1 in which the image forming apparatus 100 starts up and the second start-up period t2 in which the sheet laminator 50 starts up do not overlap each other. Accordingly, a problem in which the sum of the power consumed by the image forming apparatus 100 and the power consumed by the sheet laminator 50 exceeds the rating capacity of the power consumption in the power supply system is less likely to occur.

In other words, as illustrated in FIG. 22, when the first start-up period t1 in which the image forming apparatus 100 starts up and the second start-up period t2 in which the sheet laminator 50 starts up overlap, the sum of the power consumed by the image forming apparatus 100 and the power consumed by the sheet laminator 50 exceeds the rating capacity of the power consumption in the power supply system. Accordingly, the power supply to the image forming system 300 is interrupted by the breaker in the power supply system, and the operation of the image forming system 300 is forcibly stopped.

By contrast, in the present embodiment, the start-up shift mode, i.e., the control mode, can be performed in the image forming system 300 without a power storage device installed in the image forming system 300. Accordingly, such a problem as described above is less likely to occur without increasing the cost and size of the image forming system 300.

In the present embodiment, when the normal print mode is performed, power is not supplied to the sheet laminator 50, and the start-up shift mode, i.e., the control mode, is not performed.

In other words, in the normal print mode, the sheet laminator 50 does not start up, and only the image forming apparatus 100 starts up.

In such a case, there is no need to worry about the transition of the total power consumption due to the transition of the power consumption of the image forming apparatus 100 and the sheet laminator 50 when the sheet laminator 50 starts up. Accordingly, the start-up shift mode, i.e., the control mode, is not performed.

The controller (circuitry) causes the image forming apparatus to perform a normal print mode to: print the image on the sheet; and convey and eject the sheet, on which the image is printed, without performing the lamination processing, and the circuitry does not supply power to the sheet laminator and does not perform the shift mode in the normal print mode.

A description is now given below of a control when the lamination print mode is performed with reference to a sequence diagram of FIG. 17 and the graph of FIG. 18.

Figure 17:
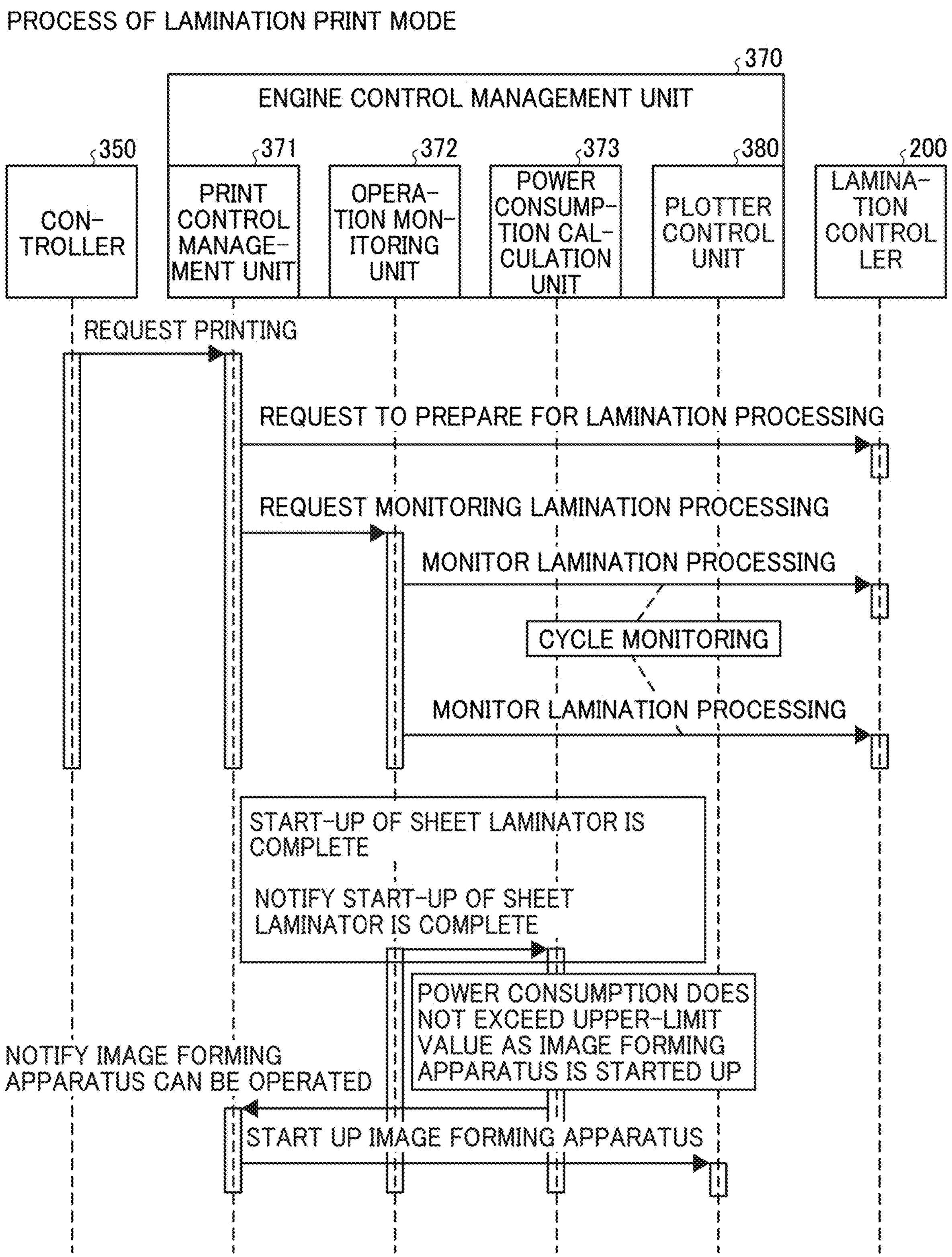
FIG. 17 is a sequence diagram of a control procedure when a lamination print mode is performed, according to an embodiment of the present disclosure.

As illustrated in FIG. 17, the print control management unit 371 requests the lamination controller 200 to prepare to perform the lamination processing based on a print request, i.e., a request for the lamination print mode, from the controller 350. Accordingly, the start-up of the sheet laminator 50 in which power is supplied to the heater 51*b* is started.

At this time, the print control management unit 371 requests the operation monitoring unit 372 to monitor the operation, i.e., the sheet separating processing, the sheet insertion processing, and the lamination processing, of the sheet laminator 50. Thus, the operation monitoring unit 372 monitors the operation of the sheet laminator 50.

When the operation monitoring unit 372 confirms the completion of the start-up of the sheet laminator 50 including the sheet lamination device 51, the operation monitoring unit 510 notifies the power consumption calculation unit 373 of the completion of the start-up of the sheet laminator 50. Then, the power consumption calculation unit 373 calculates the power consumed during the start-up of the image forming apparatus 1, i.e., the first start-up period t1, and the power consumed during the start-up of the sheet laminator 50. The power consumption calculation unit 373 notifies the print control management unit 371 of the timing to start up the image forming apparatus 100 such that the total sum of the power consumption of both the image forming apparatus 100 and the sheet laminator 50 may not exceed the upper-limit value, i.e., the rating capacity. Then, the print control management unit 371 notifies an instruction to the plotter control unit 380 to start up the image forming apparatus 100.

Performing such a control as described above, as illustrated in FIG. 18, allows the start-up of the image forming apparatus 100 to be started after the start-up of the sheet laminator 50 such that the sum of the power consumption of the image forming apparatus 100 during the start-up, i.e., the first start-up period t1, and the power consumption of the sheet laminator 50 during the start-up, i.e., the second start-up period t2, may not exceed the upper-limit value, i.e., the rating capacity.

First Modification

Figure 19:
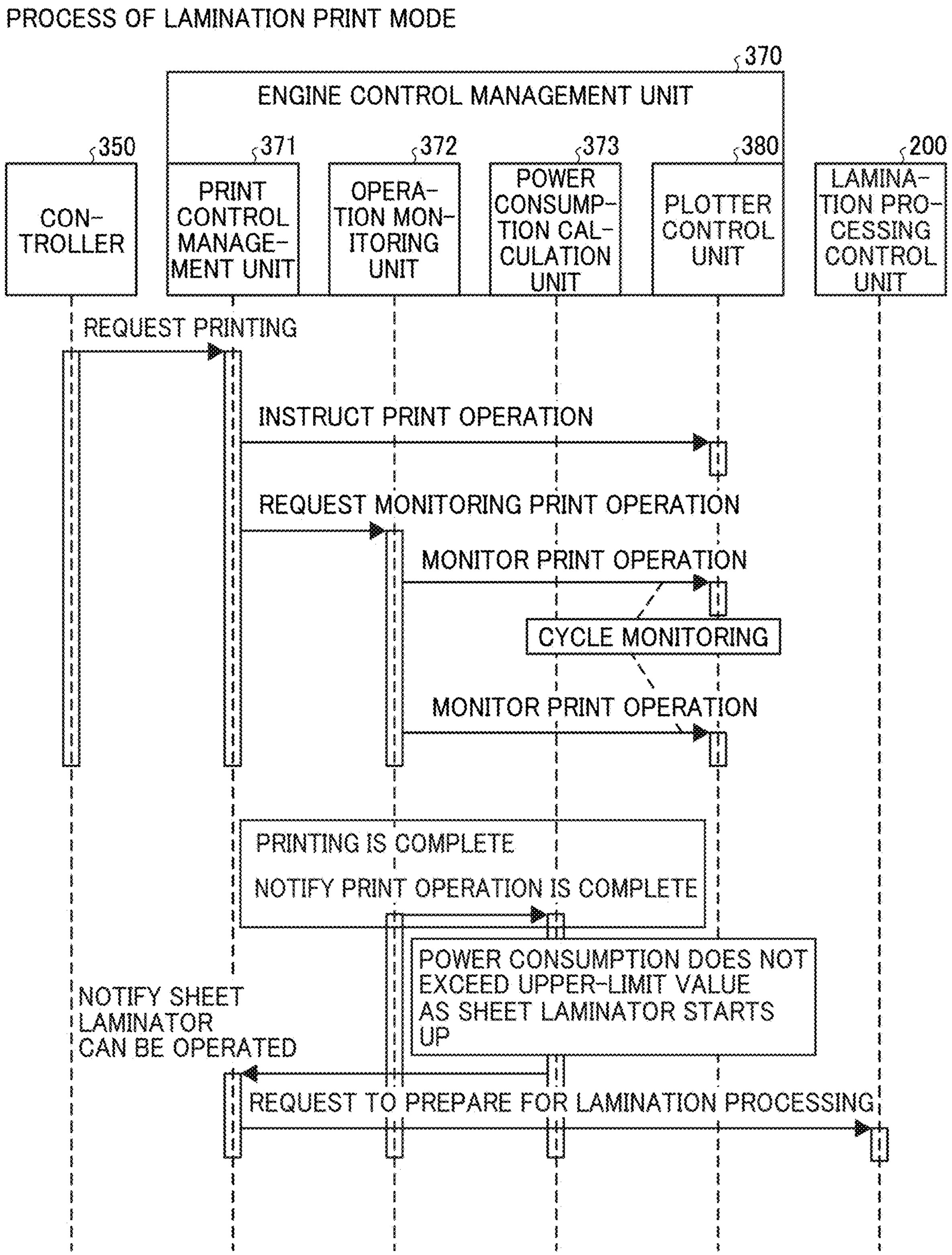
FIG. 19 is a sequence diagram of a control procedure when the lamination print mode according to a first modification is performed.
Figure 20:
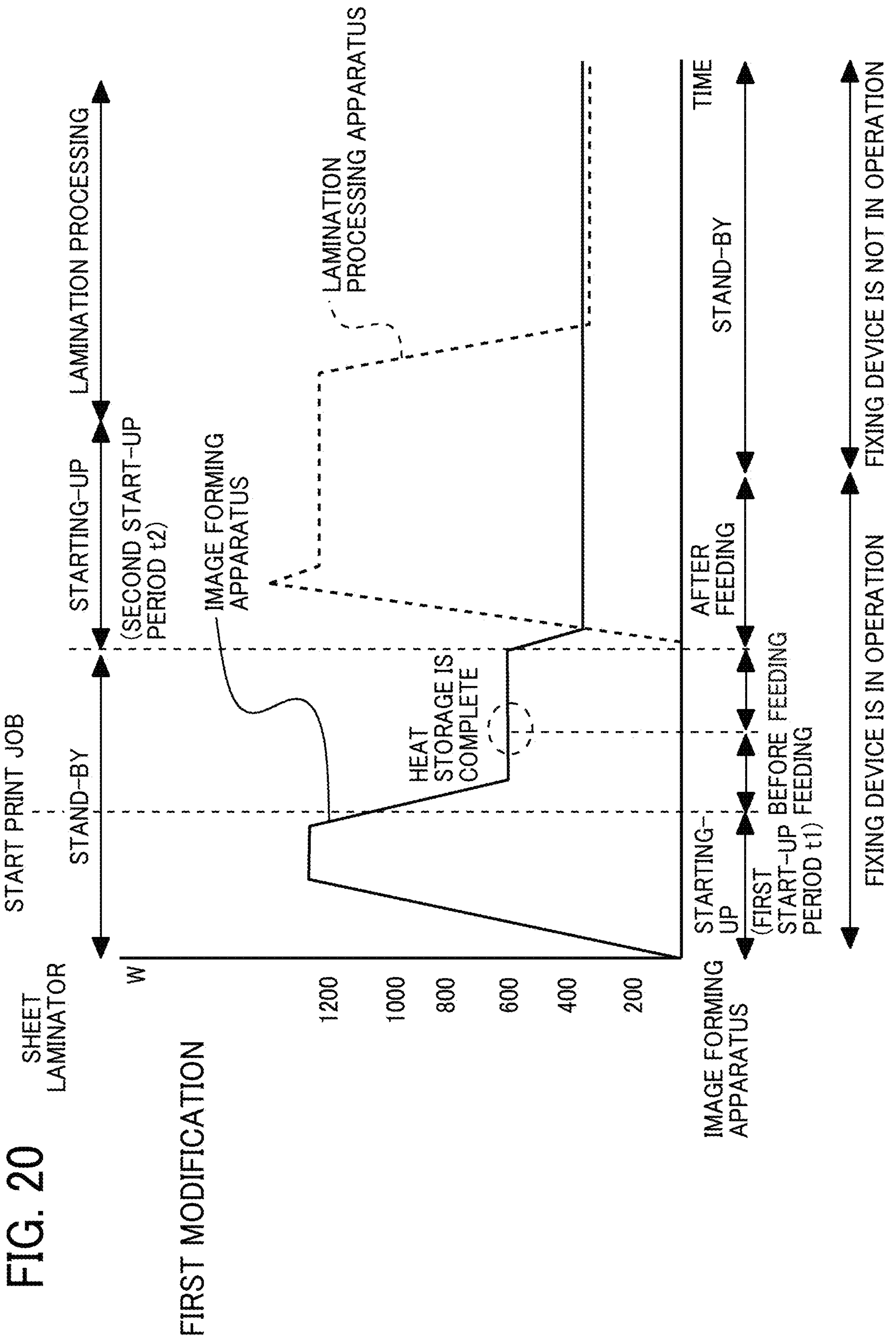
FIG. 20 is a graph illustrating a transition of power consumption when the lamination print mode is performed in the control procedure of FIG. 19.

As illustrated in FIGS. 19 and 20, the image forming system 300 according to the first modification can also perform the start-up shift mode, i.e., the control mode, such that the first start-up period t1 of the image forming apparatus 100 and the second start-up period t2 of the sheet laminator 50 do not overlap each other. However, in the first modification, unlike the examples illustrated in FIGS. 17 and 18, the first start-up period t1 of the image forming apparatus 100 is controlled such that the first start-up period t1 is started earlier than the second start-up period t2 of the sheet laminator 50. In other words, in the first modification, the image forming apparatus 100 is started up first, and after the start-up of the image forming apparatus 100 is completed, the start-up of the sheet laminator 50 is started.

Specifically, as illustrated in FIG. 19, the print control management unit 371 instructs the plotter control unit 380 to perform the printing operation of the image forming apparatus 100 based on a print request, i.e., a request of the lamination print mode, from the controller 350. Accordingly, the start-up of the image forming apparatus 1, i.e., power supply to the fixing heater 123, is started.

At this time, the print control management unit 371 requests the operation monitoring unit 372 to monitor the printing operation of the image forming apparatus 100, and the operation monitoring unit 372 monitors the printing operation of the image forming apparatus 100.

When the operation monitoring unit 372 confirms the completion of the start-up of the image forming apparatus 100 including the fixing device 120, the operation monitoring unit 372 notifies the power consumption calculation unit 373 of the completion of the start-up of the image forming apparatus 100. Then, the power consumption calculation unit 373 calculates the power consumption at the start-up of the sheet laminator 50 and the power consumption at the start-up of the image forming apparatus 100. Subsequently, the power consumption calculation unit 373 notifies the print control management unit 371 of the timing to start up the sheet laminator 50 such that the sum of the power consumption of the image forming apparatus 100 and the power consumption of the sheet laminator 50 may not exceed the upper-limit value, i.e., the rating capacity. Then, the print control management unit 371 instructs the lamination controller 200 to start up the sheet laminator 50.

Performing such a control as described above, as illustrated in FIG. 20, allows the start-up of the image forming apparatus 100 to be started after the start-up of the sheet laminator 50 is started such that the sum of the power consumption during the start-up of the image forming apparatus 100, i.e., the first start-up period t1, and the power consumption during the start-up of the sheet laminator 50, i.e., the second start-up period t2, may not exceed the upper-limit value, i.e., the rating capacity.

Second Modification

Figure 21:
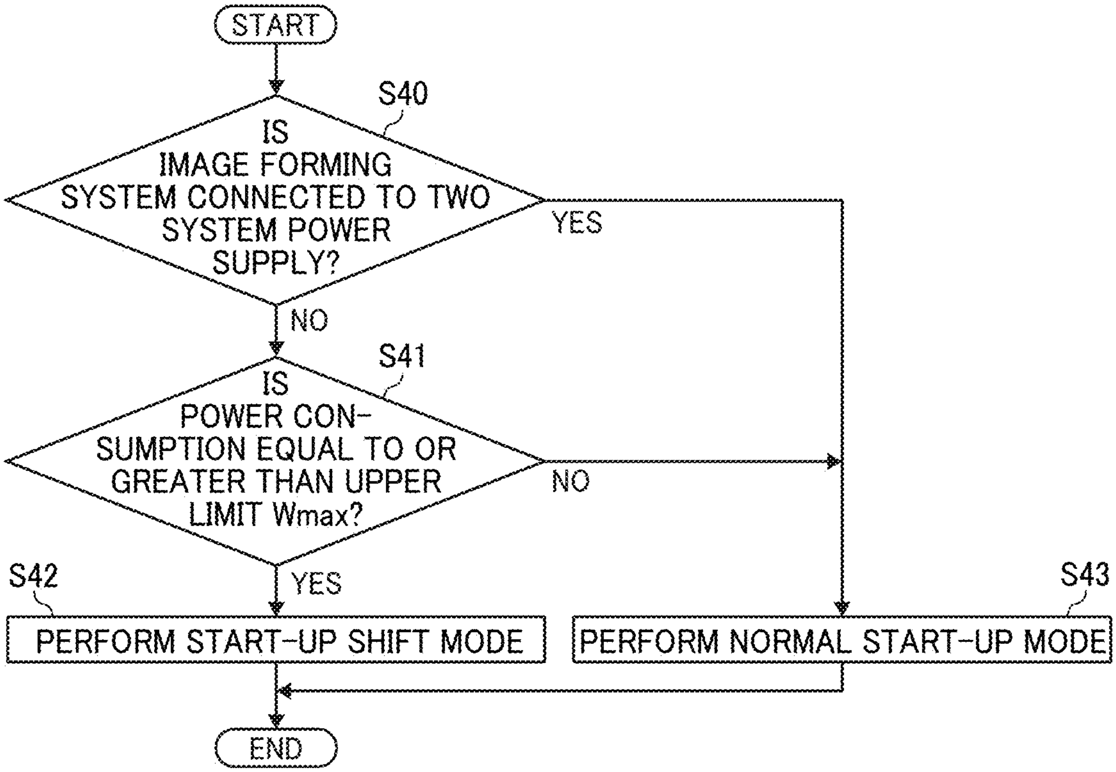
FIG. 21 is a flowchart of a control procedure when the lamination print mode according to a second modification is performed.

As illustrated in FIG. 21, in the image forming system 300 according to a second modification, when the power supply that supplies power to the image forming apparatus 100 and the power supply that supplies power to the sheet laminator 50 are connected to different power systems, i.e., two power supply systems, each having a predetermined rating capacity of power consumption, the start-up shift mode, i.e., the control mode, is not performed. However, the normal start-up mode in which the image forming apparatus 100 and the sheet laminator 50 substantially concurrently start up, is performed, as illustrated in FIG. 22.

This is because, when the image forming system 300 is connected to the two power supply systems, the rating capacity determined for the power consumption at the time at which the image forming apparatus 100 starts up and the rating capacity determined for the power consumption at the time at which the sheet laminator 50 starts up are different. Accordingly, it is not necessary to worry about the sum of the power consumption of the image forming apparatus 100 and the power consumption of the sheet laminator 50.

Specifically, as illustrated in FIG. 21, in the second modification, first, when the lamination print mode is performed, it is determined whether the image forming system 300 is connected to the two power supply systems (step S40). The above-described determination can be made based on, for example, data about the power supply manually input via the operation display panel 49 (see FIG. 1).

If it is determined in step S40 that the image forming system 300 is not connected to the two power-supply systems, it is determined that the image forming system 300 is connected to one system power supply. In such a condition, if it is determined that the sum of the power consumption during the start-up of the image forming apparatus 100 and the power consumption during the start-up of the sheet laminator 50 exceeds an upper-limit value Wmax, the start-up shift mode is performed as described above with reference to FIGS. 17 and 18 or FIGS. 19 and 20 (steps S41 and S42).

By contrast, when the sum of the power consumption of both the image forming apparatus 100 and the sheet laminator 50 does not exceed the upper-limit value Wmax in step S41, the normal start-up mode is performed (step S43).

If it is determined in step S40 that the image forming system 300 is connected to the two power-supply systems, the start-up shift mode is performed (steps S41 and S42).

Even in such a configuration as described above, a condition in which the sum of the power consumed by the image forming apparatus 100 and the power consumed by the sheet laminator 50 exceeds the rating capacity of the power consumption of the power supply system is unlikely to occur.

The image forming system includes a first power supply to supply a first power to the image forming apparatus having a first rating capacity of a power consumption; and a second power supply to supply a second power to the sheet laminator having a second rating capacity of the power consumption different from the first rating capacity, wherein the controller (circuitry) performs the lamination print mode without performing the shift mode.

Third Modification

Figure 23:
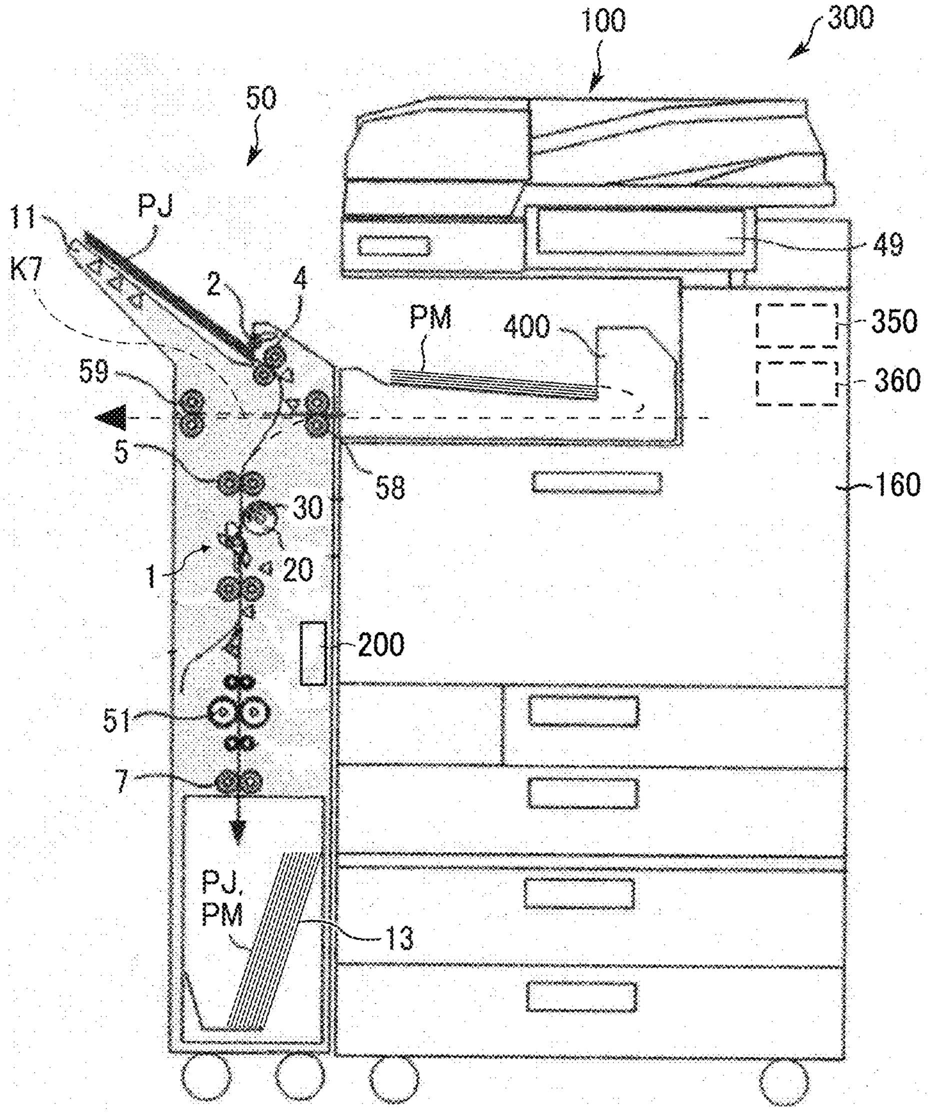
FIG. 23 is a diagram illustrating an image forming system according to a third modification.

As illustrated in FIG. 23, in the image forming system 300 according to a third modification, a vertical conveyance-type sheet laminator 50 is detachably installed on a lateral side of the image forming apparatus 100, i.e., a lateral side of the image forming apparatus 100 to which a sheet P on which an image has been formed is ejected. In the vertical conveyance-type sheet laminator 50, the unit feed tray 11 on which the two-ply sheets PJ are stacked, the sheet separator 1 including the winding roller 20, the sheet lamination device 51, and the first output tray 13 are sequentially disposed in this order from top to bottom in the vertical direction. In addition, the sheet laminator 50 includes the bypass ejection path K7, separately from the conveyance path for guiding the inner sheet PM ejected from the image forming apparatus 100 to the sheet separator 1 including the winding roller 20. The bypass ejection path K7 is an example of a sheet ejection path for ejecting the sheet P from the image forming apparatus 100 without performing the lamination processing on the sheet P. As illustrated in FIG. 23, a conveyance roller pair 58 and a conveyance roller pair 59 are disposed on the bypass ejection path K7.

The image forming system 300 includes a relay device 400 for guiding the sheet P, which includes a sheet to be the inner sheet PM, ejected from the image forming apparatus 100 to the sheet laminator 50.

The image forming system 300 as described above can also perform the start-up shift mode, i.e., the control mode, such that the first start-up period t1 of the image forming apparatus 100 and the second start-up period t2 of the sheet laminator 50 do not overlap each other.

In such a configuration as described above, a condition in which the sum of the power consumed by the image forming apparatus 100 and the power consumed by the sheet laminator 50 may exceed the rating capacity of the power consumption of the power supply system is unlikely to occur.

Fourth Modification

Figure 24:
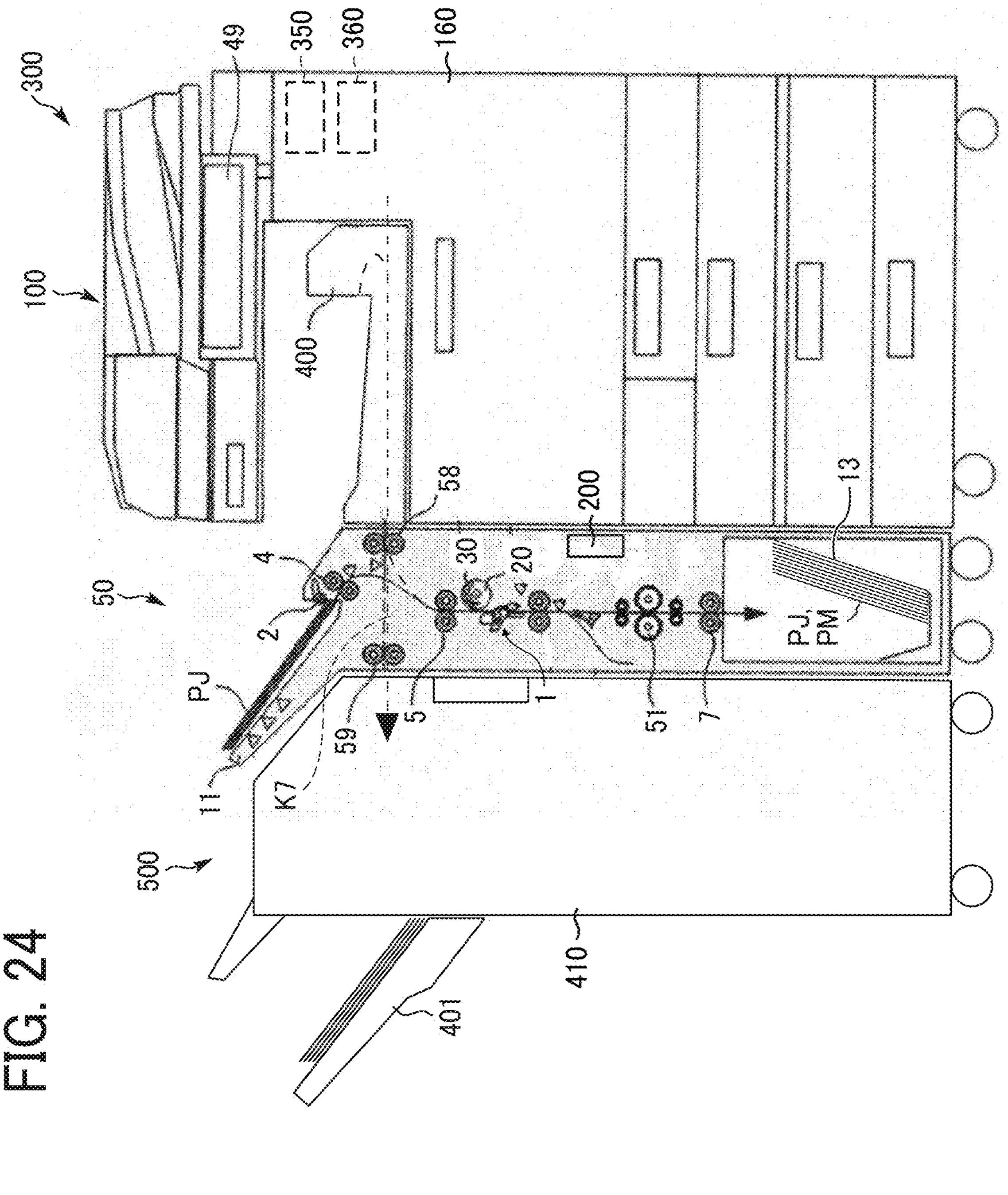
FIG. 24 is a diagram illustrating an image forming system according to a fourth modification.

As illustrated in FIG. 24, the image forming system 300 according to a fourth modification includes a post-processing apparatus 500 that performs post-processing, i.e., post-processing other than lamination processing, on a sheet P conveyed from the image forming apparatus 100.

More specifically, in the image forming system 300 according to the fourth modification, the post-processing apparatus 500 is detachably installed. The post-processing apparatus 500 performs post-processing such as punching and stapling on a sheet P, which is not subjected to the laminated processing in the normal print mode, conveyed from the image forming apparatus 100 via the sheet laminator 50.

The image forming system 300 according to the fourth modification also can perform the start-up shift mode, i.e., the control mode, such that the first start-up period t1 of the image forming apparatus 100 and the second start-up period t2 of the sheet laminator 50 do not overlap each other.

In such a configuration as described above, a condition in which the sum of the power consumed by the image forming apparatus 100 and the power consumed by the sheet laminator 50 may exceed the rating capacity of the power consumption of the power supply system is unlikely to occur.

As described above, the image forming system 300 according to embodiments of the present disclosure includes the image forming apparatus 100 that includes the fixing device 120 to fix an image on the surface of a sheet P conveyed. In addition, the image forming system 300 according to embodiments of the present disclosure includes the sheet laminator 50 that performs the lamination processing by the heater 51*b* as a heater on a two-ply sheet PJ in which an inner sheet PM is inserted between the first sheet P1 and the second sheet P2 of the two-ply sheet PJ. When the sheet laminator 50 performs the lamination processing on the inner sheet PM printed and conveyed by the image forming apparatus 100 and the lamination print mode is started, the control mode is performed to control such that the first start-up period t1, in which the power supply to the image forming apparatus 100 is started and the power supply reaches the peak value and stabilizes, and the second start-up period t2, in which the power supply to the sheet laminator 50 is started and the power supply reaches the peak value and stabilizes, do not overlap each other.

In such a configuration as described above, a condition in which the sum of the power consumed by the image forming apparatus 100 and the power consumed by the sheet laminator 50 may exceed the rating capacity of the power consumption of the power supply system is unlikely to occur.

The above-described embodiments of the present disclosure are applied to the image forming system 300 in which the image forming apparatus 100 is installed. However, the embodiments of the present disclosure may be applied to a color image forming apparatus in which a monochrome image forming apparatus is installed. In addition, the embodiments of the present disclosure are applied to the image forming system 300 in which the electrophotographic image forming apparatus 100 is installed. However, the embodiments of the present disclosure are not limited to the image forming system 300, and the embodiments of the present disclosure can also be applied to an image forming system in which an image forming apparatus of another type, such as an inkjet-type image forming apparatus or a stencil printing machine, is installed.

In the above-described embodiments, the heater 51*b* as an example of a heater is employed in the sheet lamination device 51. However, the heater that is employed for the sheet lamination device is not limited to the heater 51*b*. For example, the heater may be an electromagnetic induction heating (IH) type heater or a resistive heating element.

In the above embodiments of the present disclosure, the fixing heater 123 is employed as the fixing heater in the fixing device 120 of the image forming apparatus 100. However, the fixing heater that is employed for the fixing device is not limited to the fixing heater 123. For example, an electromagnetic induction heating (IH) type fixing heater may be employed as the fixing heater, or resistance heating elements may be employed as the fixing heater.

In the above embodiments of the present disclosure, when the normal print mode is performed, the sheet P that is not subjected to the sheet separating processing, the sheet insertion processing, and the lamination processing, is ejected via the bypass discharge path K7 of the sheet laminator 50. However, the sheet P that is not subjected to the sheet separating processing, the sheet insertion processing, and the lamination processing, may be ejected outside the image forming apparatus 100 without passing through the sheet laminator 50.

Aspects of the present disclosure are, for example, as follows and may be a combination of the following first to seventh aspects.

First Aspect

An image forming system includes an image forming apparatus and a sheet laminator. The image forming apparatus includes a fixing device to fix an image on a sheet conveyed in the image forming apparatus. The sheet laminator performs lamination processing by a heater on a two-ply sheet with the sheet conveyed from the image forming apparatus inserted between two sheets of the two-ply sheet. When a lamination print mode is started in which the sheet laminator performs the laminate processing on the sheet printed and conveyed by the image forming apparatus and ejects the sheet, a control mode is performed in which a first start-up period from when the power supply to the image forming apparatus is started until when the supplied power reaches a peak value and is stabilized and a second start-up period from when power supply to the sheet laminator is started until when the supplied power reaches the peak value and is stabilized are controlled such that the first start-up period and the second start-up period do not overlap each other.

Second Aspect

The image forming system according to the first aspect further includes a power consumption calculation unit that calculates the power consumed by the image forming apparatus during the first start-up period and the power consumed by the sheet laminator during the second start-up period. The control mode is performed when a calculation result of the power consumption calculation unit does not exceed a predetermined upper-limit value.

Third Aspect

In the image forming system according to the first or the second aspect, the first start-up period is started after the second start-up period.

Fourth Aspect

In the image forming system according to the first or the second aspect, the first start-up period is started earlier than the second start-up period.

Fifth Aspect

In the image forming system according to the first or the fourth aspect, when a normal print mode in which the sheet printed and conveyed by the image forming apparatus is ejected without being subjected to the lamination processing is performed, the power is not supplied to the sheet laminator, and the control mode is also not performed.

Sixth Aspect

In the image forming system according to the first or the fourth aspect, the control mode is not performed when a power supply that supplies power to the image forming apparatus and a power supply that supplies power to the sheet laminator are connected to different power supply systems each having a predetermined rating capacity of power consumption.

Seventh Aspect

In the image forming system according to the first or the sixth aspect, the sheet laminator includes a sheet separator to separate a portion of the two-ply sheet in which the two sheets are superposed and bonded at the bonding portion and the sheet lamination device including the heater to heat the superposed sheet in which the sheet is inserted between the two sheets that have been separated. The sheet separator is disposed upstream from the sheet laminator in a conveyance direction of the superposed sheet into which the sheet is inserted.

Any of the cases described above exhibits substantially the same advantages as the advantages of the embodiments of the present disclosure.

Embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited to the embodiments and thus may be preferably set.

In embodiments of the present disclosure, the “end face” of the two-ply sheet is defined as a side face extending in the thickness direction and connecting the front face and the back face of the two-ply sheet. Accordingly, the rectangular superposed sheet has four end faces, i.e., front, rear, left and right end faces.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The present disclosure can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The invention claimed is:

1. An image forming system comprising:
- an image forming apparatus to print an image on a sheet;
- a sheet laminator including a heater to perform a lamination processing on a two-ply sheet with the sheet, which is conveyed from the image forming apparatus and inserted between two sheets of the two-ply sheet; and
- circuitry to:
  - calculate a power consumed by the image forming apparatus during a first start-up period and a power consumed by the sheet laminator during a second start-up period;
  - control a timing, based on the calculation result, of a later one of the first start-up period or the second start-up period and control, based on the calculation result, a power supply during the later one of the first start-up period or the second start-up period;
  - perform a lamination print mode to cause the sheet laminator to perform the lamination processing on the sheet printed and conveyed from the image forming apparatus; and
  - perform a shift mode to:
    - start a power supply to the image forming apparatus and control an end of the power supply when the power supply reaches a first peak value and is stabilized during the first start-up period; and
    - start the power supply to the sheet laminator and control an end of the power supply when the power supply reaches a second peak value and is stabilized during the second start-up period shifted from the first start-up period.

2. The image forming system according to claim 1,
- wherein the power supply includes a first power and a second power;
- wherein the circuitry is further configured, in the shift mode, to:
- control a sum of the first power and the second power to be smaller than a predetermined upper-limit value.

3. The image forming system according to claim 1,
- wherein the circuitry is configured to controls the first start-up period to be after the second start-up period in the shift mode.

4. The image forming system according to claim 1,
- wherein the circuitry is configured to control the first start-up period to be before the second start-up period in the shift mode.

5. The image forming system according to claim 1,
- wherein the circuitry is configured to cause the image forming apparatus to perform a normal print mode to:
- print the image on the sheet; and
- convey and eject the sheet, on which the image is printed, without performing the lamination processing, and
- the circuitry does not supply power to the sheet laminator and does not perform the shift mode in the normal print mode.

6. The image forming system according to claim 1, further comprising:
- a first power supply configured to supply a first power to the image forming apparatus having a first rating capacity of a power consumption; and
- a second power supply configured to supply a second power to the sheet laminator having a second rating capacity of the power consumption different from the first rating capacity,
- wherein the circuitry is configured to control the image forming system to perform the lamination print mode without performing the shift mode, and
- wherein the power supply including the first power and the second power.

7. The image forming system according to claim 1,
- wherein the sheet laminator includes:
- a sheet separator configured to separate a portion of the two-ply sheet in which the two sheets are superposed one on another and bonded at a bonding portion of the two-ply sheet; and
- a sheet lamination device configured to heat the two-ply sheet in which the sheet is inserted between the two sheets of the two-ply sheet separated from each other, and the sheet separator is upstream from the sheet lamination device in a conveyance direction of the two-ply sheet from the image forming apparatus to the sheet laminator.

8. An image forming method comprising:

printing an image on a sheet;

calculating a power consumed by an image forming apparatus during a first start-up period and a power consumed by a sheet laminator during a second start-up period;

controlling a timing based on the calculation result of a later one of the first start-up period or the second start-up period and controlling, based on the calculation result, a power supply during the later one of the first start-up period or the second start-up period;

performing a lamination processing on a two-ply sheet with the sheet, which is inserted between two sheets of the two-ply sheet;

performing a lamination print mode to perform the lamination processing on the sheet printed and conveyed; and performing a shift mode to:

start the power supply to the printing and control an end of the power supply when the power supply reaches a first peak value and is stabilized during the first start-up period; and start the power supply to the lamination processing and control an end of the power supply when the power supply reaches a second peak value and is stabilized during the second start-up period shifted from the first start-up period.

9. The image forming method according to claim 8, in the shift mode, further comprising:

controlling a sum of a first power and a second power to be smaller than a predetermined upper-limit value, wherein the power supply includes the first power and the second power.

10. The image forming method according to claim 8, wherein the first start-up period is after the second start-up period in the shift mode.

11. The image forming method according to claim 8, wherein the first start-up period is before the second start-up period in the shift mode.

12. The image forming method according to claim 8, further comprising:

performing a normal print mode to:

print the image on the sheet; and convey and eject the sheet, on which the image is printed, without performing the lamination processing, wherein the performing the normal print mode does not supply the power to the lamination processing and does not perform the shift mode in the normal print mode.

13. The image forming method according to claim 8, further comprising:

supplying a first power to the printing having a first rating capacity of a power consumption; and supplying a second power to the lamination processing having a second rating capacity of the power consumption different from the first rating capacity, wherein the performing the lamination print mode does not perform the shift mode, and wherein the power supply includes the first power and the second power.

14. The image forming method according to claim 8, further comprising:

separating a portion of the two-ply sheet in which the two sheets are superposed one on another and bonded at a bonding portion of the two-ply sheet; and heating the two-ply sheet in which the sheet is inserted between the two sheets separated from each other.

15. The image forming system according to claim 2, wherein the circuitry is configured to control the sum of the first power and the second power to be smaller than the predetermined upper-limit value during the later one of the first start-up period or the second start-up period and both the first power and the second power are non-zero.

16. An image forming system comprising:

an image forming apparatus to print an image on a sheet, the image forming apparatus including a fixing device;

a sheet laminator including a heater to perform a lamination processing on a two-ply sheet with the sheet, which is conveyed from the image forming apparatus and inserted between two sheets of the two-ply sheet; and circuitry to:

perform a lamination print mode to cause the sheet laminator to perform the lamination processing on the sheet printed and conveyed from the image forming apparatus; and perform a shift mode to:

start a power supply to the fixing device and control an end of the power supply when the power supply reaches a first peak value and is stabilized during a first start-up period; and start the power supply to the sheet laminator and control an end of the power supply when the power supply reaches a second peak value and is stabilized during a second start-up period shifted from the first start-up period.

* * * * *